United States Patent
Uehara

(10) Patent No.: US 7,199,928 B2
(45) Date of Patent: Apr. 3, 2007

(54) OPTICAL ELEMENT, OPTICAL DROP MODULE, OPTICAL ADD-DROP MODULE, AND TUNABLE LIGHT SOURCE

(75) Inventor: Noboru Uehara, Komaki (JP)

(73) Assignee: Santec Corporation, Komaki (JP)

( * ) Notice: Subject to any disclaimer, the term of this patent is extended or adjusted under 35 U.S.C. 154(b) by 343 days.

(21) Appl. No.: 10/883,015

(22) Filed: Jul. 1, 2004

(65) Prior Publication Data

US 2005/0013000 A1 Jan. 20, 2005

(30) Foreign Application Priority Data

Jul. 17, 2003 (JP) .............. 2003-275840

(51) Int. Cl.
*G02F 1/03* (2006.01)
*G02F 1/07* (2006.01)
*G02B 1/10* (2006.01)

(52) U.S. Cl. ............... 359/586; 359/587; 359/590

(58) Field of Classification Search ......... 359/586–589
See application file for complete search history.

(56) References Cited

U.S. PATENT DOCUMENTS

| | | | |
|---|---|---|---|
| 3,308,394 A | 3/1967 | Snitzer et al. | |
| 3,546,620 A | 12/1970 | Erickson et al. | |
| 4,240,696 A | 12/1980 | Tracy et al. | |
| 5,027,178 A | 6/1991 | Svilans | |
| 5,068,749 A * | 11/1991 | Patel | 349/198 |
| 5,731,889 A | 3/1998 | Jeong et al. | |
| 6,317,251 B1 | 11/2001 | Wang | |
| 6,522,469 B1 * | 2/2003 | Fuqua et al. | 359/578 |
| 2002/0009251 A1 | 1/2002 | Byrne | |
| 2002/0191268 A1 * | 12/2002 | Seeser et al. | 359/260 |
| 2003/0020926 A1 | 1/2003 | Miron | |
| 2003/0081319 A1 | 5/2003 | Hsu | |
| 2003/0087121 A1 * | 5/2003 | Domash et al. | 428/641 |
| 2005/0013000 A1 | 1/2005 | Uehara | |

FOREIGN PATENT DOCUMENTS

| | | |
|---|---|---|
| JP | 61-88229 A | 5/1986 |
| JP | 61-268071 A | 11/1986 |
| JP | 5-241083 A | 9/1993 |
| JP | 8-227014 A | 9/1996 |
| JP | 9-325287 A | 12/1997 |
| JP | 11-119186 A | 4/1999 |
| JP | 2001-21852 A | 1/2001 |
| JP | 2001-91911 A | 4/2001 |
| JP | 2001-324702 A | 11/2001 |

* cited by examiner

*Primary Examiner*—Fayez G. Assaf
(74) *Attorney, Agent, or Firm*—Smith Patent Office

(57) ABSTRACT

An optical element has a structure in that a first mirror stack layer is formed on a substrate. A first transparent conductive film, a conductive buffer layer, a spacer layer having a primary or secondary electrooptic effect, a conductive buffer layer and a second transparent conductive film are stacked thereon in succession; and a second mirror stack layer is further formed thereon. A voltage is applied between the first and second transparent conductive films. The applied voltage change the refractive index of the spacer, changes a wavelength to be transmitted through or reflected from the layer.

9 Claims, 23 Drawing Sheets

F I G. 7
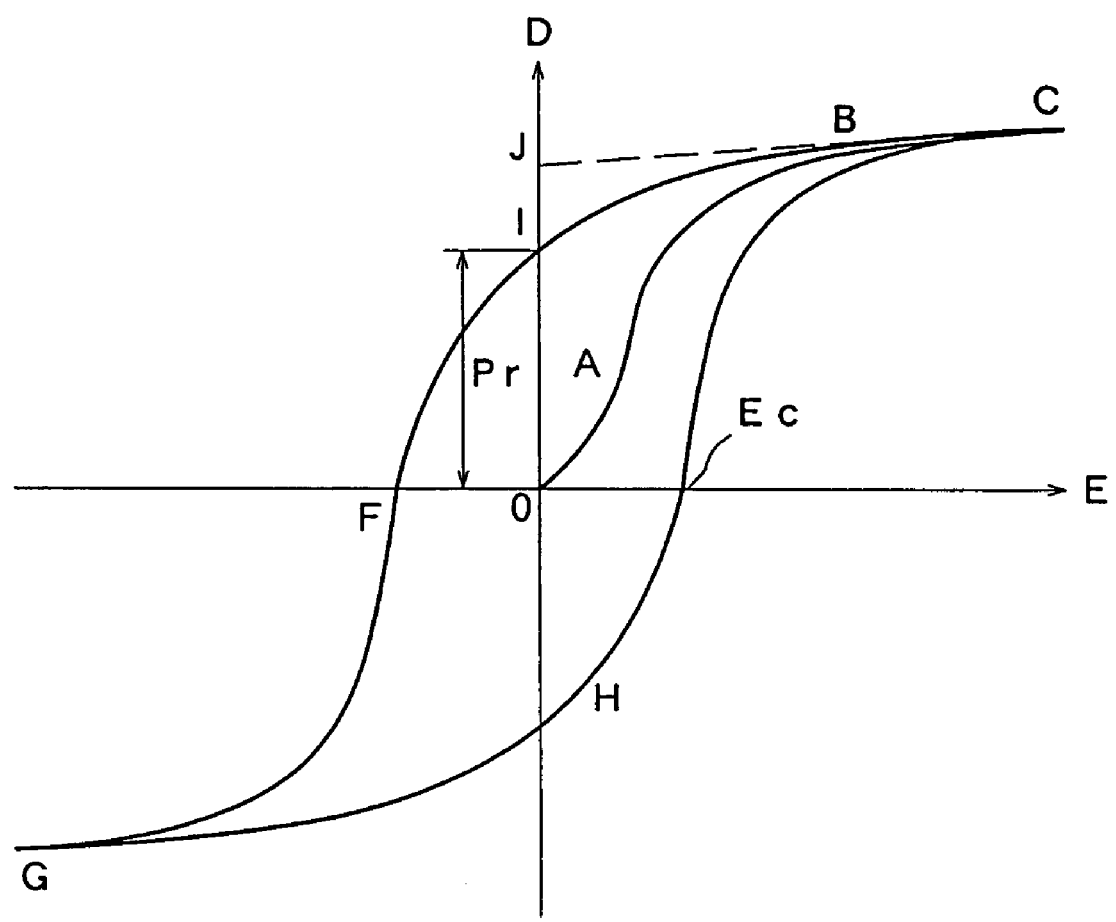

F I G. 1 1 G
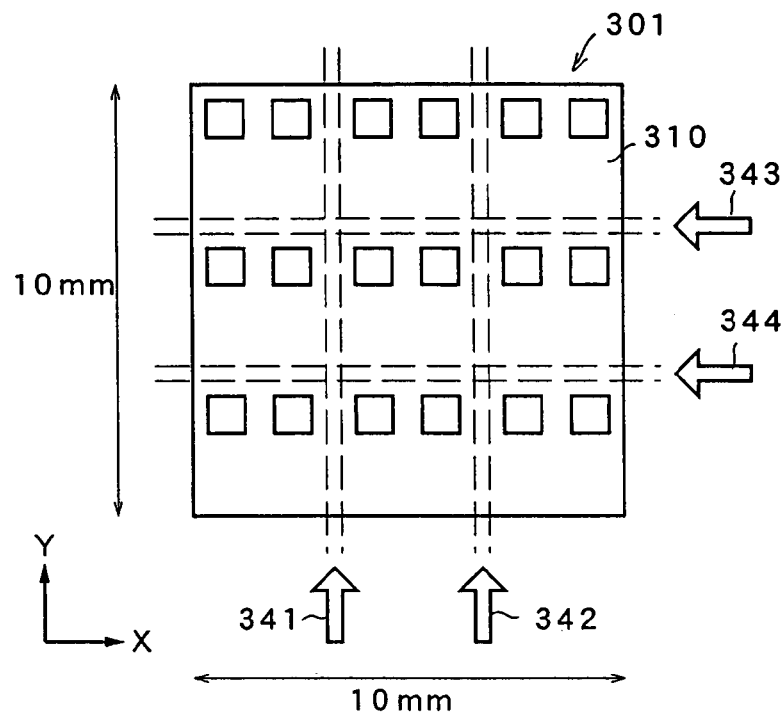
F I G. 1 1 H
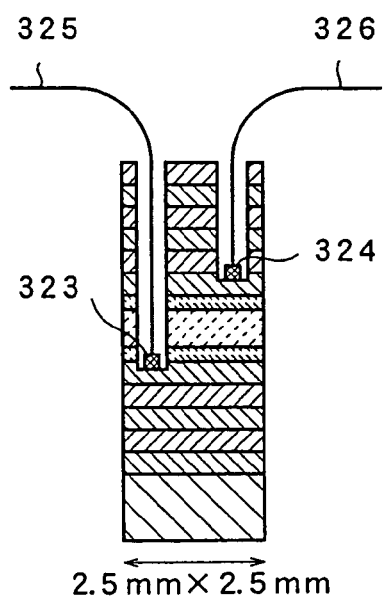

OPTICAL ELEMENT, OPTICAL DROP MODULE, OPTICAL ADD-DROP MODULE, AND TUNABLE LIGHT SOURCE

BACKGROUND OF THE INVENTION

1. Field of the Invention

The present invention relates to an optical element, an optical drop module, an optical add-drop module, and a tunable light source, using such an optical element.

2. Discussion of the Related Art

Optical bandpass filters have been used for selecting light with a specific wavelength from inputted light rays. Among the bandpass filers, a tunable optical filter capable of changing a wavelength to be selected is applied various cases. For example, the tunable filter is used as a component of a multi-channel analyzer so as to change the wavelength to measure properties of a substance. The typical application has been proposed in JP-A 08-227014 (1996). This tunable optical filter has realized tunable characteristic by changing the physical film thickness.

FIG. 1 shows a tunable optical filter in accordance with a first prior art. This tunable optical filter 101 has a structure in that a dielectric multilayer film filter 102 is attached onto a movable stage 103, and maintained thereon in a manner to freely shift in the direction of arrow X. The dielectric multilayer film filter 102 is constituted by dielectric multilayer films 109 formed by alternately stacking a number of first and second dielectric films 107 and 108 having mutually different refractive indexes with continuously varied thicknesses on one surface of a transparent substrate 106. The filter 102 is attached with its length direction being set in the direction of arrow X. Here, FIG. 1 indicates these stacked layers in a schematic manner. The central wavelength of the filter 102 is proportional to the optical film thickness nL. Here, the value n denotes the effective refractive index of a medium which constitutes the filter and the value L denotes its film thickness. By forming the dielectric multilayer film filter 102 having bandpass filter characteristics, with the film thickness having a gradient along a one-dimensional direction (the direction of arrow X), it is possible that in the place where the film is thin, a transmission peak is set at a short wavelength, and that in the place where the film is thick, the transmission peak is set at a long wavelength.

Upon using this tunable optical filter 101, a photodiode (PD) 111 is secured at a fixed position so that incident light 112 is made incident on the photodiode 111 through the dielectric multilayer film filter 102. In this layout, when the filter 102 is shifted in the direction of arrow X, the peak transmission wavelength is changed in response to the shift in the direction of arrow X, so that the wavelength of receiving light of the photodiode 111 changes continuously.

FIG. 2 shows the relationship between the selected wavelength when the tunable optical filter of is shifted in the direction of arrow X in FIG. 1 and transmissibility of the light. As shown in FIG. 2, when the tunable optical filter is, for example, shifted by the movable stage 103 from a first position $X_1$ to a second position $X_2$ in the direction of arrow X, the transmitting wavelength of light changes continuously from a first wavelength $\lambda_1$ to a second wavelength $\lambda_2$ in accordance with the shift. In FIG. 2, for example, two wavelengths are shown between the first position $X_1$ and the second position $X_2$.

In conventional tunable filters, only the bandpass filter referred to as a single cavity type has been put into practical use. This is because, as the number of cavities increases to double, triple and so on, the film thickness control of each layer which constitutes the multilayer film filter becomes difficult. In general, in the tunable filter device used in the optical communication technique, those filter devices having a substrate dimension of about 50×4 mm are used. In the first conventional example, it is difficult to form a dielectric multilayer filter having 100 or more layers over the entire surface of a large substrate with a film thickness gradient ranging over 50 mm in a one-dimensional direction, with each of desired film-thickness distributions. Moreover, it is difficult to produce the filters with high yield, causing very high costs. In order to realize a tunable bandpass filter having a narrow band of 1 nm or less in the transmission band width in the optical communication field, it is required that films should be formed with a desired film thickness of each layer in an error level of 0.01% or less. The range of the conforming article which satisfies this accuracy is generally almost only the 3 to 10 mm range, due to film thickness distribution variations upon film formation in a film forming device, aging variations of the film formation condition and the like. Therefore, tunable bandpass filters obtained through another different technique have been desired.

The optical communication system obtained by the wavelength division multiplexing (WDM) system has been noticed as the next generation large-capacity optical communication system. In the optical communication system of the WDM system, optical signals ($\lambda_1, \lambda_2, \ldots, \lambda_n$) which have respectively different wavelengths are allowed to propagate through one optical fiber. Therefore, each of nodes needs to have the ability of carrying out a process for adding (inserting) or dropping (picking out) optical signals with a single or a plurality of wavelengths on demand. An optical add-drop module (OADM) is used to meet the demand. The OADM is an optical separation/coupling device that is inserted into a network of the optical communication, and extracts information from the high-speed communication path and introduces information into the communication path.

In the conventional OADM, the wavelength to be added or dropped is fixed to a single wavelength. In other words, only the optical signal of specific one wavelength corresponding to a specific signal channel is extracted (dropped) from a multi-wavelength signal component that propagates through a single optical fiber, and an optical signal having the same wavelength is introduced (added) thereto. Moreover, in order to allow further flexible signal processing, an OADM that can dynamically select an optional signal channel, and add or drop an optical signal of the corresponding wavelength is required. In such a module, not a bandpass filter for allowing only one of the wavelengths to pass, but a bandpass filter with tunable characteristic is required.

In the tunable optical filter 101 shown in FIG. 1, the selection of wavelength is carried out by mechanically shifting the movable stage 103. Therefore, even in an attempt to apply the tunable optical filter 101 to this OADM, there is a limitation in the response speed upon changing the wavelength to be added or dropped. For this reason, although it is possible to meet a limited request such as a request for assigning a specific communication path to a specific customer during a predetermined time zone, it is impossible to dynamically select a wavelength to be added or dropped at a high speed.

JP-A 05-241083 (1993) and JP-A 09-325287 (1997) have proposed a structure which provides an optional wavelength by changing an incident angle of a dielectric multilayer film filter. FIG. 3 shows a tunable optical filter in accordance with the second prior art. The tunable optical filter 114 of the second prior art has a structure in that a dielectric multilayer film filter 116 is formed on one surface of a substrate 115, and light rays 117 are made incident on the dielectric multilayer film filter 116 at an incident angle θ. This tunable optical filter 114 transmits light rays having a wavelength corresponding to the incident angle θ with respect to a normal 118 to the tunable optical filter 114. Therefore, the wavelength of the transmitted light ray can be changed by rotating the tunable optical filter 114 on a face in parallel with the paper face.

FIG. 4 shows a state where the center wavelength of the tunable optical filter shown in FIG. 3 changes. In this figure, the axis of abscissa indicates the incident angle θ of the tunable optical filter 114, and the axis of ordinate indicates the center wavelength λ of the transmitted light. As the incident angle θ becomes greater, the center wavelength λ becomes shorter.

FIG. 5 shows the tunable optical filter shown in FIG. 3 and its driving system. A rotary base 121 on which the tunable optical filter 114 is placed receives a turning force from a DC motor 123 through a reduction gear 122, and is allowed to rotate in a predetermined direction at a predetermined reduction ratio, or in a direction reversed to this direction, and also to stop at a desired angle. Since an encoder 124 is attached to the DC motor 123, the rotation angle is detected. Therefore, the rotation angle of the rotary base 121 is controlled by using an operation unit (not shown) with the incident light rays 117 in a predetermined direction fixed at the tunable optical filter 114, so that it can optionally change the wavelength of the transmitted light 125. The tunable optical filter 114 has a feature in that it can vary the wavelength in a wide range, for example, in a tunable range from 20 nm to 100 nm.

However, since the tunable optical filter 114 uses mechanisms such as the DC motor 123 and the reduction gear 122, such mechanisms limits a high-speed response. The tunable speed is slow with a variable range per 0.1 second of 10 nm even at the maximum speed. Therefore, the application to the optical measuring field requiring a high-speed tunable function, such as spectroscopic analysis, remote sensing, gas analysis, optical memory and optical medical diagnosis, is limited.

Researches for tunable optical filters with higher response speed have been made. JP-A 11-119186 (1999) has proposed a tunable optical filter in which a wavelength to be selected is made variable by changing the refractive index of liquid crystal under control of an applied voltage. FIG. 6 shows a structure of the tunable optical filter in accordance with a third prior art. The tunable optical filter 131 is provided with a first layer 132, a second layer 133 that is placed on the light-incident side with respect to the first layer 132, and a third layer 134 that is placed on the light emission side with respect to the first layer 132. Optical mirrors (dielectric mirror) films 135A and 135B are placed on the second and third layers 133 and 134 on the sides closer to the first layer 132. Moreover, the other layers except for these layers on the second and third layers 133 and 134 constitute transparent electrodes 136A and 136B. Transparent substrates 137A and 137B are formed on the outside of the second and third layers 133 and 134, and anti-reflection coat films 138A and 138B are formed on the outside of these layers.

The first layer 132 of the tunable optical filter 131 is made of a material the refractive index of which changes in response to an electric field. This material is formed by dispersing liquid crystal droplets having a diameter of not more than 150 nm in a light-transmitting medium such as polymer (high molecules) and quartz glass. The second layer 133 is transparent within a wavelength band to be used, and has no polarization dependency with respect to changes in the refractive index with or without the application of a voltage.

The tunable optical filter 131 is a Fabry-Perot etalon-type tunable filter that uses a polymer as the matrix medium with a micro-liquid crystal droplet dispersion polymer being sandwiched between cavities thereof. In the case where no voltage is applied to the transparent electrodes 136A and 136B, the liquid crystal molecules in the liquid crystal droplet in the first layer 132 are arranged in random directions. Therefore, the refractive index that is exerted on light made incident on the micro-liquid crystal droplet dispersion polymer layer corresponds to an averaged refractive index of refractive indexes ($n_e$, $n_o$) of nematic liquid crystal. When a voltage is applied by using an AC power supply (not shown), the liquid crystal molecules are aligned in the direction of the applied electric field, and the refractive index approaches $n_o$. In response to such a change in the refractive index, the transmission spectrum to incident light 141 made incident on the tunable optical filter 131 is changed, with the result that the wavelength of the transmission light 142 is changed.

Here, the tunable optical filter 131 shown in FIG. 6 requires a high voltage of not less than 100 volts as an applied voltage. Moreover, many transmission peaks of a wavelength occur cyclically with respect to the wavelength axis. Consequently, in order to shield transmission peaks occurring outside the originally required wavelength band, another filter is further required. Moreover, the filter properties are more susceptible to environmental influences such as humidity and temperature. For this reason, it becomes difficult to obtain superior properties with respect to incident light with a high output.

Moreover, in the tunable optical filter 131 shown in FIG. 6, the driving operation for liquid crystal needs to be carried out by an AC current, and is not carried out by a DC current. An attempt to carry out a DC driving operation would cause a dielectric breakdown. The resulting problem is that, although the tunable optical filter 131 is allowed to change the wavelength, it fails to maintain the wavelength in a fixed state within a desired filter wavelength.

The foregoing description has discussed conventional problems with tunable optical filters, and with respect to optical elements other than tunable optical filers that selectively absorb and reflect a specific wavelength component also, conventionally, the same problems have been raised. Moreover, a optical add-drop module, optical drop module, and tunable light source using the abovementioned tunable optical filters have the same problems.

SUMMARY OF THE INVENTION

An object of the present invention is to provide an optical element capable of optionally changing the wavelength and achieving a fast response speed, a tunable optical filter, an optical drop module, an optical add-drop module and a tunable light source.

The optical element of the present invention has a structure in that at least one cavity is formed on a substrate. The cavity includes first and second composite stack layers, a spacer layer and a conductive buffer layer.

The first composite stack layer includes a first mirror stack layer formed by alternately stacking a plurality of first and second dielectric thin films having respectively different refractive indexes, and a first conductive film formed on the first mirror stack layer. The second composite stack layer includes a second mirror stack layer formed by alternately stacking a plurality of first and second dielectric thin films having respectively different refractive indexes, and a second conductive film formed on the second mirror stack layer. The spacer layer is placed between the first and second composite stack layers and is made of a plane dielectric member having at least one of a primary and secondary electrooptic effect. The conductive buffer layer is formed between at least one of the first and second composite stack layers and the spacer layer.

In the present invention, the first composite stack layer having the first mirror stack layer and the first conductive film made of a conductive film and formed thereon and the second composite stack layer having the same structure are placed in a manner so as to sandwich the spacer layer. Thus an optical element, such as a tunable optical filter, which is made of a dielectric member having the primary or secondary electrooptic effect and has a Fabry-Perot resonator structure as its basic structure, is formed. Further, by changing a voltage applied to the first and second conductive films, it is possible to control spectrum characteristics of light rays made incident on the first and second composite stack layers and transmitted through or reflected from the layer.

The present invention utilizes the primary or secondary electrooptic effect. The optical element having the spacer layer with the primary electrooptic effect enables a self-maintaining function, which can maintain the current state even upon turning the voltage off. Moreover, the optical element having the spacer layer with the secondary electrooptic effect hardly has hysteresis effect, which tend to be generated by the primary electrooptic effect. For this reason, it becomes possible to set and control the center wavelength of the optical element such as a tunable optical filter with high precision, in response to the applied voltage.

Here, the first and second mirror stack layers may be formed by alternately stacking the first dielectric thin film made of a high refractive index material having a physical film thickness of a ¼-wavelength of a design wavelength and the second dielectric thin film made of a low refractive index material having a physical film thickness of the ¼-wavelength with a refractive index lower than that of the high refractive-index material.

The spacer layer may be placed between the first and second mirror stack layers, and formed as a dielectric thin film that has a film thickness of positive even-number times the physical film thickness of the ¼-wavelength and has the primary or secondary electrooptic effect.

The first and second dielectric films may be formed as conductive thin films each of which has a film thickness of positive odd-number times the physical film thickness of the ¼-wavelength.

Moreover, at each of the cavities, a characteristic controlling unit may be added to form an optical element for altering a voltage to be applied between the first and second conductive films. The characteristic control unit controls spectrum characteristics of light rays that are made incident on the first composite stack layer or the second composite stack layer and transmitted through or reflected from the layer.

Moreover, in the present invention, a conductive buffer layer is formed between at least one of the first composite stack layer and the second composite stack layer and the spacer layer. In other words, the conductive buffer layer may be present on the face of the spacer layer, or may be present on both of the faces thereof. The introduction of the conductive buffer layer allows high-speed response and also allows epitaxial growth of an electrooptical film to easily take place. For this purpose, the conductive buffer layer may be formed on only the base conductive layer. This case is advantageous in that an increase in the insertion loss at the time of varying a wavelength is cut to half.

In the case where the conductive film has high resistivity and its resistance value consequently limits the high-speed responding property, the formation of the conductive buffer layer in contact with the spacer layer makes it possible to improve the high-speed responding property.

As described above, in accordance with the present invention, by altering the film design, it is possible to realize an optical element having an optional passband width and a signal eliminating characteristic for signals with the other wavelengths. Since the wavelength is changed by controlling the refractive index, no mechanical driving units are required, making it possible to improve reliability. The optical element is also excellent in environment resistance. Moreover, by designing films, the optical element of the present invention can achieve a tunable optical filter having an optional passband width and a signal eliminating characteristic for signals with other wavelengths, that is, various filters such as a lowpass filter, highpass filter, bandpass filter and notch filter. The present invention simply requires electrode terminals and circuit components to be used for controlling an applied voltage so that it is possible to form a tunable optical filter at low cost.

Moreover, by utilizing a wavelength selection unit that controls a voltage to be applied to the first and second conductive films in each of the cavities, it is possible to realize an optical drop module and an optical add-drop module having an optional passband width and a signal eliminating characteristic for signals with other wavelengths. The present invention simply requires electrode terminals and circuit components to be used for controlling an applied voltage so that it is possible to form a tunable light source at low cost.

BRIEF DESCRIPTION OF THE DRAWINGS

FIG. 7 is a performance mapping that shows hysteresis in association with an electric flux density and an electric field;

FIGS. 11A to 11H are explanatory diagrams that show respective processes of a manufacturing method of the single cavity-type tunable bandpass filter in accordance with the second embodiment;

DESCRIPTION OF THE PREFERRED EMBODIMENTS

Figure 1:
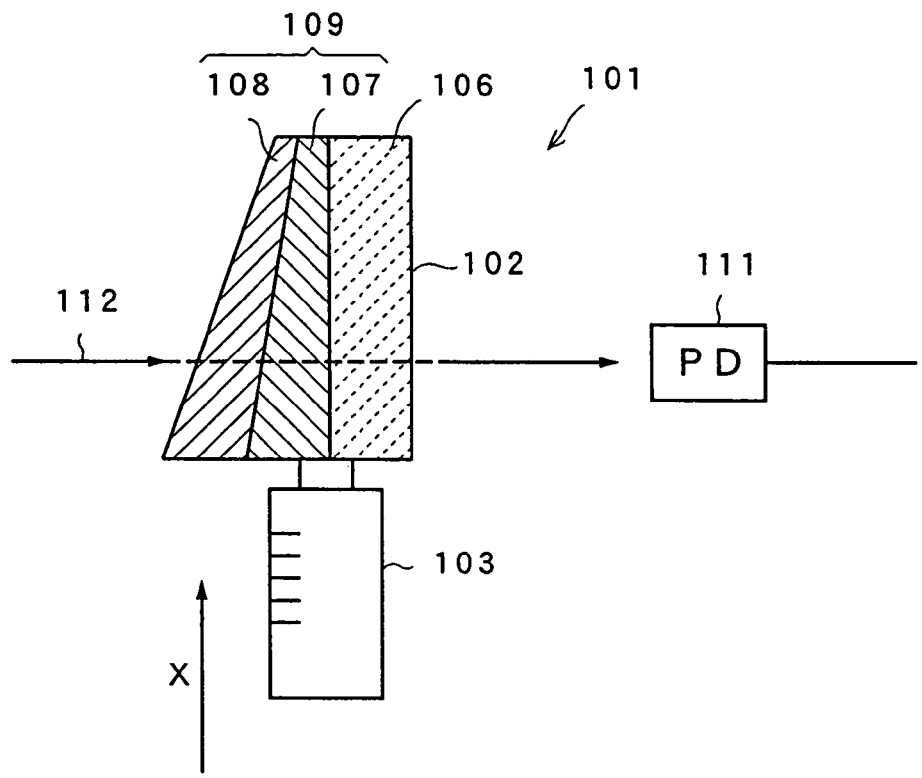
FIG. 1 is a schematic structural diagram that shows a tunable optical filter in accordance with a first prior art.
Figure 2:
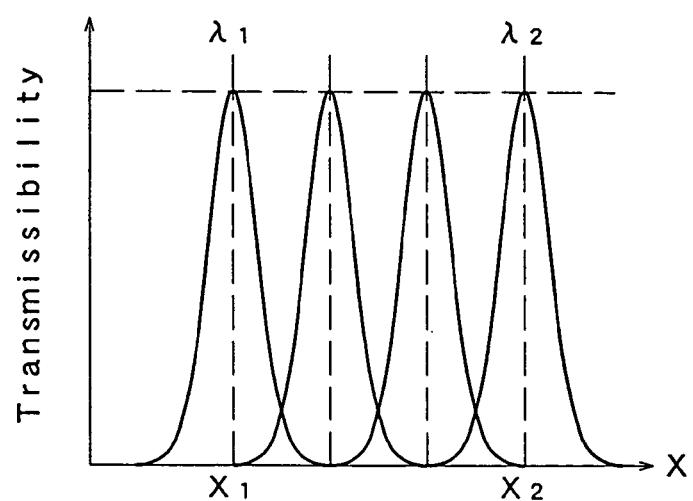
FIG. 2 is an explanatory diagram that shows the relationship between a range of wavelengths to be selected by the tunable optical filter of the first prior art and transmissibility of light.
Figure 3:
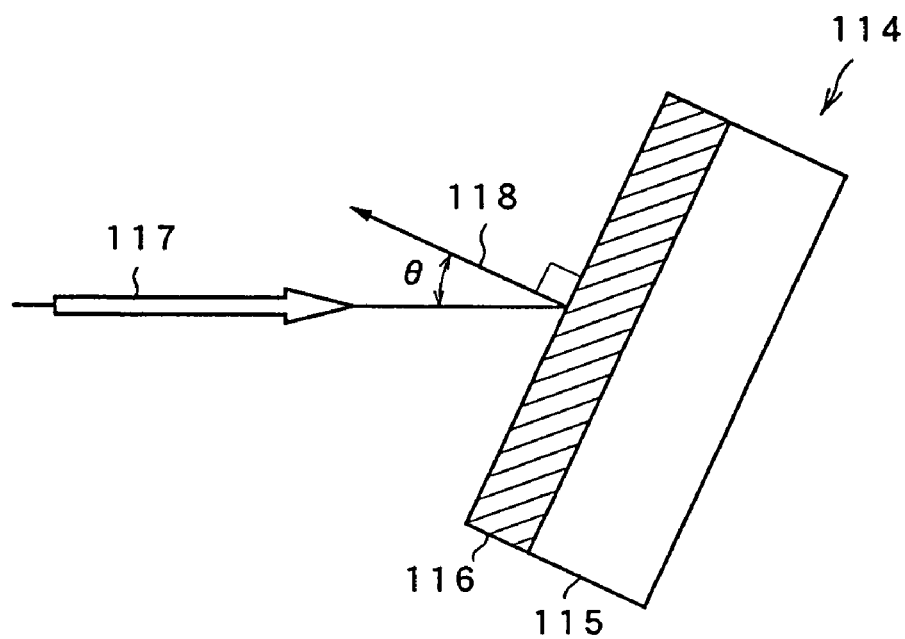
FIG. 3 is a schematic structural diagram that shows a tunable optical filter in accordance with a second prior art.
Figure 4:
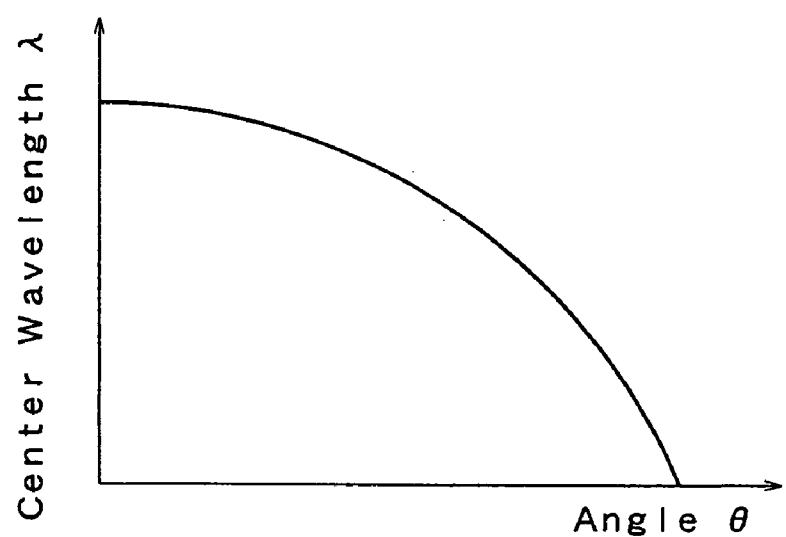
FIG. 4 is a performance mapping that shows the change in a center wavelength of the tunable optical filter of the second prior art.
Figure 5:
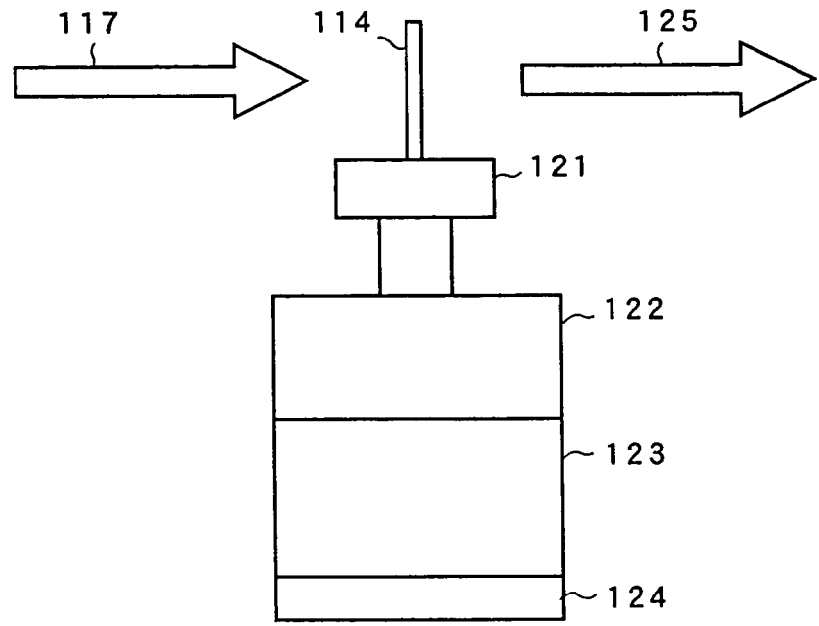
FIG. 5 is a schematic structural diagram that shows the tunable optical filter of the second prior art and its driving system.
Figure 6:
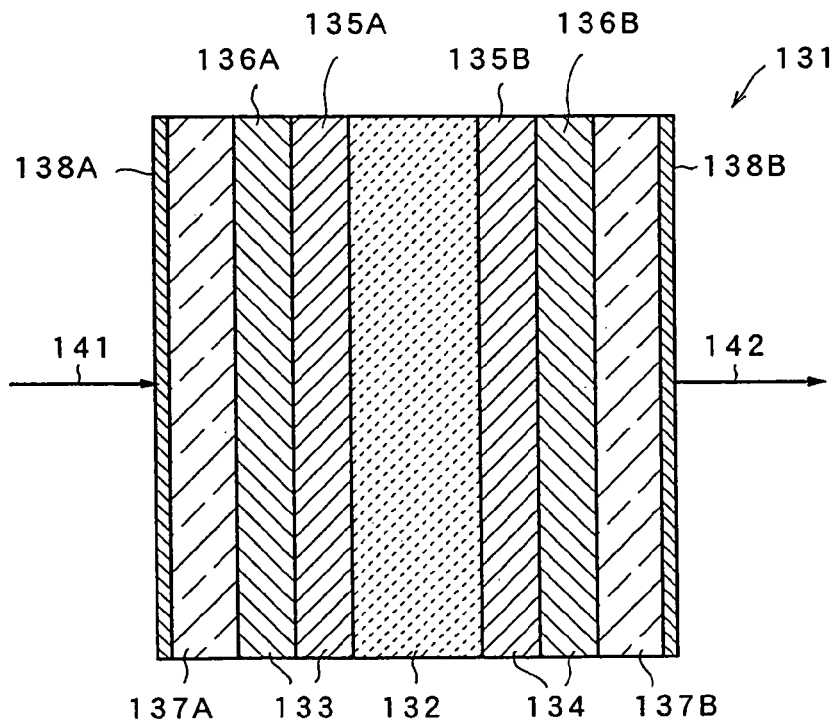
FIG. 6 is a cross-sectional view that shows a structure of a tunable optical filter in accordance with a third prior art.

First, the technology, which forms the presupposition of this invention, will be explained by exemplifying a tunable filter in the optical element. A dielectric multilayer film filter can realize characteristics of various filters such as a lowpass filter, highpass filter, bandpass filter and notch filter, through film designing. In these days, it is also used as the filter for the optical communication, and its high reliability with respect to the environmental resistance and the like has been proved.

The conventional dielectric multilayer film filter is a passive element, and the refractive index and attenuation coefficient of the film are less susceptible to a big change to extrinsic factors such as the temperature, humidity, light irradiation and voltage application, so that it is very stable. It is proposed to control the optical film thickness of each of the thin films that constitute a dielectric multilayer film filter by using any of these extrinsic factors.

Therefore, this invention attempts to utilize the electrooptic effect among them. The electrooptic effect is an effect which changes the refractive index in response to the externally applied voltage. The effect in which the refractive index is linearly changed in response to the applied voltage is referred to as the primary electrooptic effect or the Pocketls effect, and this effect appears in ferroelectrics. The following equation (1) holds between the change quantity $\Delta n_{ij}$ in the refractive index due to the primary electrooptic effect and the applied voltage.

$$\Delta n_{ij} = -(\tfrac{1}{2}) n_M^3 r_{ij} (V/d) \quad (1)$$

Here, $n_M$ is the refractive index of the medium which has an electrooptic effect, and $r_{ij}$ is the primary electrooptic coefficient. V represents the applied voltage and d represents the thickness of the medium between electrodes.

With respect to the primary electrooptic coefficient $r_{ij}$, there are elements in which the coefficients become zero and elements in which the coefficients are equal to each other, depending on the symmetry of the crystal structure. For example, in case of $BaTiO_3$ which belongs to 4 mm of the tetragonal system, the following equations hold:

$$r_{13}=r_{23},\ r_{51}=r_{42},\ r_{33} \neq 0 \quad (2).$$

Except for these, the other coefficients become zero.

The refractive index change that is proportional to the square of the applied voltage is referred to as the secondary electrooptic effect or the Kerr effect and this effect is exerted in paraelectric materials. The following equation (3) holds between the change quantity $\Delta n_{ij}$ in the refractive index due to the secondary electrooptic effect and the applied voltage.

$$\Delta n_{ij} = -(\tfrac{1}{2}) n_M^3 R_{ij} (V/d)^2 \quad (3)$$

Here, $R_{ij}$ is the secondary electrooptic coefficient.

In case of a paraelectric material, since the material is an isotropic medium, the following equations (3) hold from the symmetric property.

$$R_{11}=R_{22}=R_{33},\ R_{12}=R_{13}=R_{23}=R_{31}=R_{32},\ R_{44}=R_{55}=R_{66} \quad (3)$$

Incidentally, the other coefficients become zero.

With respect to the thin film that has the electrooptic effect suitable for optical communication, it is desirable to satisfy the following conditions:

(a) To have a great electrooptic coefficient;
(b) To have superior environmental resistance against the temperature, the humidity and the like;
(c) To be less susceptible to losses in the thin film itself;
(d) To achieve a stable operation for a long time;
(e) To provide reproducible film-forming processes in a stable manner; and
(f) Not to require a large amount of rare metal materials.

The present invention utilizes the primary or secondary electrooptic effect so as to satisfy the above-mentioned conditions. Even when the applied voltage is reduced to 0 V, the memory function for maintaining the voltage-applied state is available based upon the primary electrooptic effect. This function makes it possible to maintain the applied state even when the power supply stops due to a power failure or the like. Moreover, in the case where the secondary electrooptic effect is utilized, the hysteresis effect, which is caused by the primary electrooptic effect, hardly occurs. Therefore, it becomes possible to set and control the central wavelength of an optical element such as a tunable optical filter with high precision in response to an applied voltage.

FIG. 7 shows a D-E hysteresis curve that indicates the hysteresis in association with an electric flux density D and an electric field F. In an attempt to use the memory function by utilizing the primary electrooptic effect of a ferroelectric phase, by successively following a path from 0 to A, B, C and C, B, I in the figure with respect to the applied electric field in the D-E hysteresis curve, a remanent polarization (Pr) can be formed. At point I, although the applied voltage is 0 V, the remanent polarization is exerted so that an electric filed resulting from the polarization is maintained in an electrooptical film. For this reason, the refractive index change derived from the electrooptic effect is maintained and this process is utilized as a memory function. This memory function is maintained as long as the phase state in the film is not changed, that is, as long as no phase transition occurs due to a change in the ambient temperature. With respect to the method for erasing the memory function, as shown in FIG. 7, by following a path of I to F with a negative electric field being applied, the polarization is set to zero.

Here, in the ferroelectric phase, since the relative dielectric constant is generally set to not less than 1000 although it depends on materials to be used, there is a limitation imposed on the high-speed response. In such a case, the secondary electrooptic effect is preferably utilized. The use of the secondary electrooptic effect with a paraelectric phase can provide a high-speed response. In an attempt to stop the memory function completely, the secondary electrooptic effect is preferably utilized. In the paraelectric phase, since the dielectric constant is generally set to not more than 1000 although it depends on used materials, it is possible to utilize the advantage of the high-speed response.

In the case of a BST (barium-strontium titanate ($S_{rx} Ba_{1-x} TiO_3$)-based electrooptical material, $SrTiO_3$ in which X=1 exhibits the paraelectric phase in the vicinity of room temperature. Therefore, it is possible to utilize the secondary electrooptic effect, and since the relative dielectric constant is as small as about 300, it is superior in the high-speed response. In an attempt to utilize the memory function, the ratio of Ba/Sr is increased so that the resulting ferroelectric phase may be utilized. In the case of PLZT-based and KTN-based electrooptical materials also, by adjusting the ratio of components thereof, it becomes possible to adjust the ferroelectric phase and the paraelectric phase, as well as the dielectric constant and the size of polarization.

First, the basic structure of the dielectric multilayer film filter will be described. It supposes that in the optical filter, two kinds of different dielectric materials are used and that the refractive indexes thereof are indicated by $n_H$ and $n_L$ respectively. Moreover, the greater refractive index is defined as the refractive index $n_H$, and the corresponding dielectric material (film) is referred to as high-refractive index dielectric thin film H in the present specification. The smaller refractive index is defined as the refractive index $n_L$, and the corresponding dielectric material (film) is referred to as low-refractive index dielectric thin film L in the present specification.

Upon film-designing the optical filter, the film structure which realizes a dielectric multilayer film mirror having high reflectivity centered on a specific design wavelength $\lambda_0$ is represented by the following expression structure (5):

Substrate/H L H L . . . H L/Medium (5).

Here, each of the film thicknesses $d_H$ and $d_L$ of the high-refractive index dielectric film H and the low-refractive index dielectric film L is a physical film thicknesses of a ¼-wavelength, and between the specific design wavelength $\lambda_0$ and the refractive indexes $n_H$, $n_L$, the following equations (6) and (7) hold:

$$d_H = \lambda_0/4n_H \quad (6)$$

$$d_L = \lambda_0/4n_L \quad (7).$$

Generally, the medium is either of air, a resin solvent, a solid substrate and the like.

Expression structure (5) indicates a structure in that two kinds of dielectric thin films made of the high-refractive index dielectric thin film H and the low-refractive index dielectric thin film L are alternately laminated on a substrate. Therefore, this expression structure (5) can be simply represented by the following expression structure (8):

Substrate/(H L)$^N$/Medium (8).

Expression structure (8) indicates a structure in that a pair of layers of the dielectric film H and the dielectric film L are stacked N times repeatedly. For example, the following expression structure (9) is equivalent to expression structure (10).

Substrate/H L H L H L/Medium (9)

Substrate/(H L)$^3$/Medium (10)

When only a specific light wavelength component is separated and extracted, a bandpass filter is used in most cases. The general structure of the resonator of the bandpass filter constituted by the dielectric multilayer film is represented by the following expression structure (11):

$$A=[(HL)^N H sL H(LH)^N L] \quad (11).$$

Here, symbol N indicates an integer (0, 1, 2, 3, . . . ). Also, symbol s represents a positive even number (2, 4, 6, 8, . . . ). "(HL)$^N$ H" and "H (LH)$^N$" respectively represent layers referred to as a first mirror stack layer or a second mirror stack layer. "sL" represents a spacer layer. Here, L on the last part represents a coupling layer.

This expression structure (11) indicates a single basic cavity structure of the optical element. In the case of an m-multiplex cavity structure, m-sets of this expression structure (11) are successively laminated on a surface on the upper side of a substrate through coupling layers. By using such an m-multiplex cavity structure having a plurality of laminated layers as the basic cavity structure, it is possible to provide a sharp filter property, for example, as a bandpass filter. The coupling layer, made of a low-refractive index material, is placed between layers in the basic cavity structure.

(First Embodiment)

Figure 8:
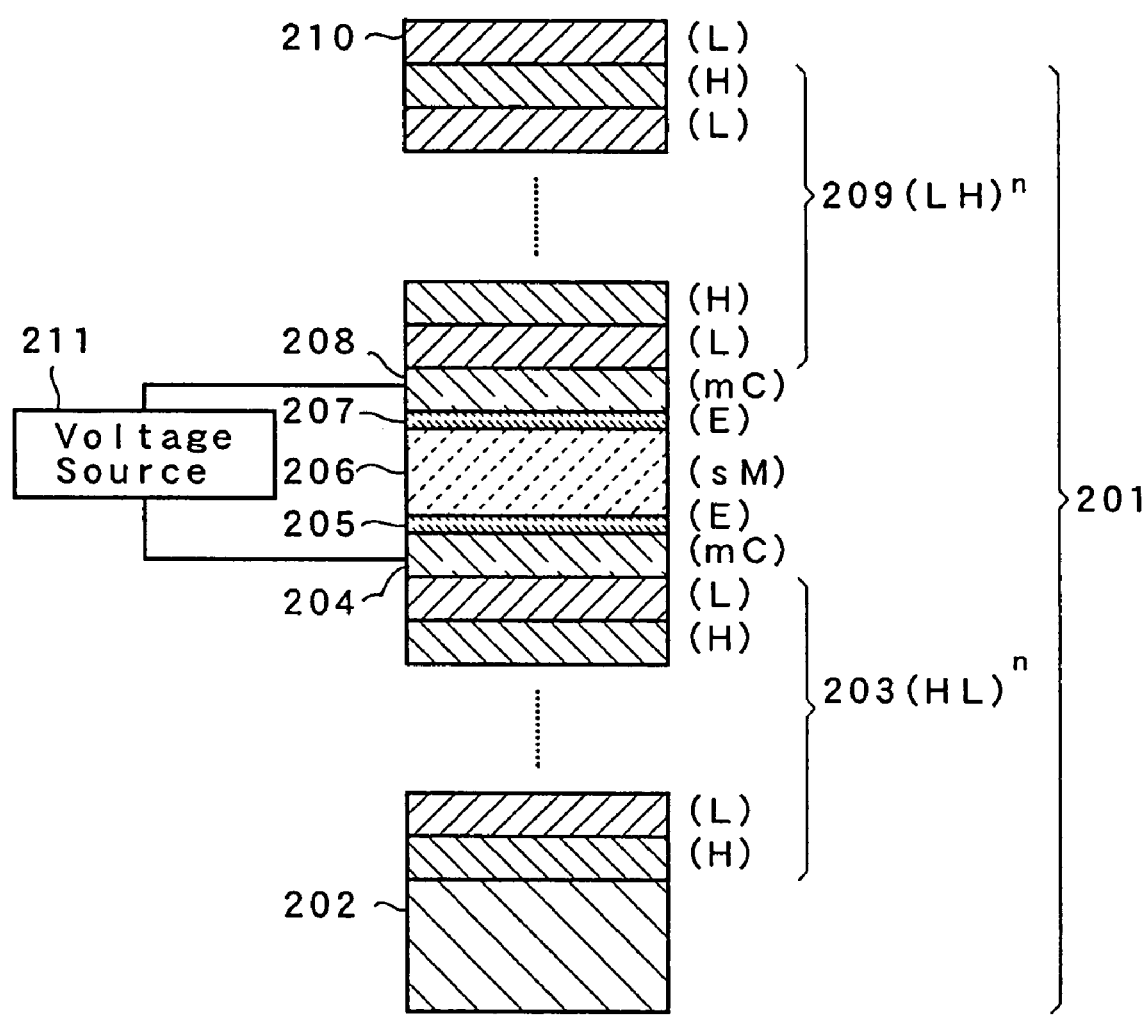
FIG. 8 is a schematic structural diagram that shows a cross-sectional structure of an optical element in accordance with a first embodiment of the present invention.

The following description will discuss embodiments of the present invention. FIG. 8 shows a schematic cross-sectional structure of an optical element in accordance with a first embodiment of the present invention. This optical element 201 has a structure in that a first mirror stack layer 203 is formed on a substrate 202 with a first conductive thin film 204 being formed thereon. The first mirror stack layer 203 and the first conductive thin film 204 constitute a first composite stack layer. Then, a conductive buffer layer 205 is formed thereon, and a spacer layer 206, which is a dielectric thin film that exerts a primary electrooptic effect or a secondary electrooptic effect, and a conductive buffer layer 207 are further formed thereon. Moreover, a second composite stack layer, constituted by a second transparent conductive film 208 and a second mirror stack layer 209, is formed thereon. A coupling layer 210 is formed on the second mirror stack layer 209. The first transparent conductive film 204 and the second transparent conductive layer 208 are conductive thin films, and a voltage source 211 to be used for applying a voltage thereto is attached thereto. The optical element 201 of the first embodiment is used, for example, as a single cavity-type bandpass filter.

Each of the first mirror stack layer 203 and the second mirror stack layer 209 is constituted by a plurality of sets of two kinds of different dielectric substance H and dielectric substance L, both having a physical film thickness of a ¼-wavelength of a design wavelength, which are alternately stacked.

The dielectric multilayer film of the optical element of the present embodiment is indicated by the following expression structure (12):

$$B=[(HL)^N(kC\ E)sM(E\ kC)(LH)^N L] \quad (12).$$

Here, symbol C represents a conductive film and M represents a dielectric member that exerts electrooptic effects. Each of these paraelectric films C and M has a physical film thickness with the ¼-wavelength. Coefficient k indicates an odd number (1, 3, 5, . . . ), and coefficient s represents an even number (2, 4, 6, . . . ). That is, in expression structure (12), the dielectric substance layer H that is made in contact with the spacer layer of the first mirror stack layer in expression structure (11) is replaced by a first conductive film (kC), that is, the first transparent conductive film 204. Moreover, in expression structure (12), the dielectric substance layer H that is made in contact with the spacer layer of the second mirror stack layer in expression structure (11) is replaced by a second conductive film (kC), that is, the second transparent conductive film 208, so that the spacer layer 205 forms a dielectric film (sM) having the electrooptic effect.

In other words, the optical element 201 such as a tunable optical filter of the present embodiment has first and second composite conductive layers. The first composit conductive layer constitutes by the transparent conductive film 204 and the conductive buffer layer (E) 205. The second composite conductive layer constituted by the transparent conductive film 208 and the conductive buffer layer (E) 207. Each of the conductive buffer layers 205 and 207 is made in contact with the spacer layer (sM) 206, and has a thickness ranging from 0.1 nm to 100 nm.

In the present embodiment, a conductive buffer layer is formed between the first composite stack layer as well as the second composite stack layer and the spacer layer; and the conductive buffer layer may be present on one of the faces of the spacer layer or may be present on both of the surfaces thereof. The introduction of the conductive buffer layer has advantages and disadvantages. The main advantages are that it provides high-speed response and that it allows epitaxial growth to easily take place in the electrooptical film. For these purposes, the conductive buffer layer may be formed on only the base conductive layer. In this case, the resulting advantage is that an increase in the insertion loss at the time of the wavelength variation is cut in half.

In the case where the transparent conductive film has high resistivity and its resistance value consequently limits the high-speed responding property, the formation of a conductive buffer layer in contact with the electrooptical film forming the spacer layer makes it possible to improve the high-speed responding property. With respect to the transparent conductive films, the first composite conductive layer that is made in contact with the first mirror stack layer and the second composite conductive layer that is made in contact with the second mirror stack layer are basically made of the same material; however, the present invention is not intended to be limited by this arrangement. Transparent conductive films made of different materials may be used as the respective composite conductive layers.

In addition to these cases, the conductive buffer layer is preferably introduced, in particular, when an attempt is made to reduce and improve leak current caused in the electrooptical film and also to reduce and improve coming out of ions (for example, oxygen ions) that form the electrooptical film. As described above, by systematically reviewing factors such as the tunable range, response speed, repeated cycling property, leak current and temperature characteristics, the introduction of the conductive buffer layer and the selection of its material are desirably carried out.

With respect to the conductive buffer layers 205 and 207 in the optical element 201, preferable conditions are set as follows:

(1) At room temperature, the resistivity is set to not more than $10^{-2}$ Ωcm, more preferably not more than $10^{-4}$ Ωcm.

(2) The lattice constant is set close to the lattice constant of the electrooptical film forming the spacer layer, preferably, with a lattice mismatching rate of not more than ±20%.

The lattice mismatching rate (M) is defined by the following equation (13):

$$M=(d_E-d_S)/d_S \quad (13).$$

Here, the symbol $d_E$ indicates lattice constant of the electrooptical film that constitutes the conductive buffer layers 205 and 207 and the symbol $d_S$ indicates that of the spacer layer 206. The lattice constants may be matched in the high order; however, more preferably, they are matched based upon the basic order.

With respect to the property of a film to be formed as the spacer layer, any film structure is used as long as it contains a polycrystal film structure except for the amorphous film and the polycrystal film structure. Here, in order to obtain a greater electrooptical coefficient, an oriented film is preferably used. Further, an epitaxial film that provides the same electrooptical coefficient as the single crystal is more preferably used. With respect to the film-forming method for the electrooptical thin films constituting the spacer layer, any of the following film-forming methods may be used: electron beam vapor deposition method, ion-assist vapor deposition method, DC magnetron sputtering method, RF magnetron sputtering method, ion plating method, ion-beam sputtering method, molecular-beam epitaxy (MBE) method, chemical vapor phase deposition (CVD) method, dip coating method and pulse-laser deposition method. In any of these film-forming methods, upon carrying out adjustments on a flow rate and an addition concentration of a gas supply (such as oxygen gas) that are used for controlling the composition ratio of a film to be formed, adjustments on the current and voltage level of a beam current, and adjustments on the degree of vacuum during film-forming processes, the film of the present invention makes it can control these factors. Moreover, it can control crystallinity and also to provide a smooth thin-film interface, by optimizing the film-forming temperature.

In the optical element 201 in accordance with the embodiment shown in FIG. 8, the voltage source 211 serving as a characteristic controlling unit is connected between the first transparent conductive film 204 and the second transparent conductive thin film 206. The optical element becomes tunable by changing voltage V to be applied across the conductive thin films 204 and 205 using the voltage source 211.

The following description discusses the frequency response. In the optical element 201, the conductive thin films 204 and 208, which are made in contact with the mirror stack layers 203 and 209, have a finite electrical resistance value R, and the spacer layer 206 made of a paraelectric material having a primary or secondary electrooptic coefficient has a capacitance C. The time response is limited by the product of these values.

Figure 9:
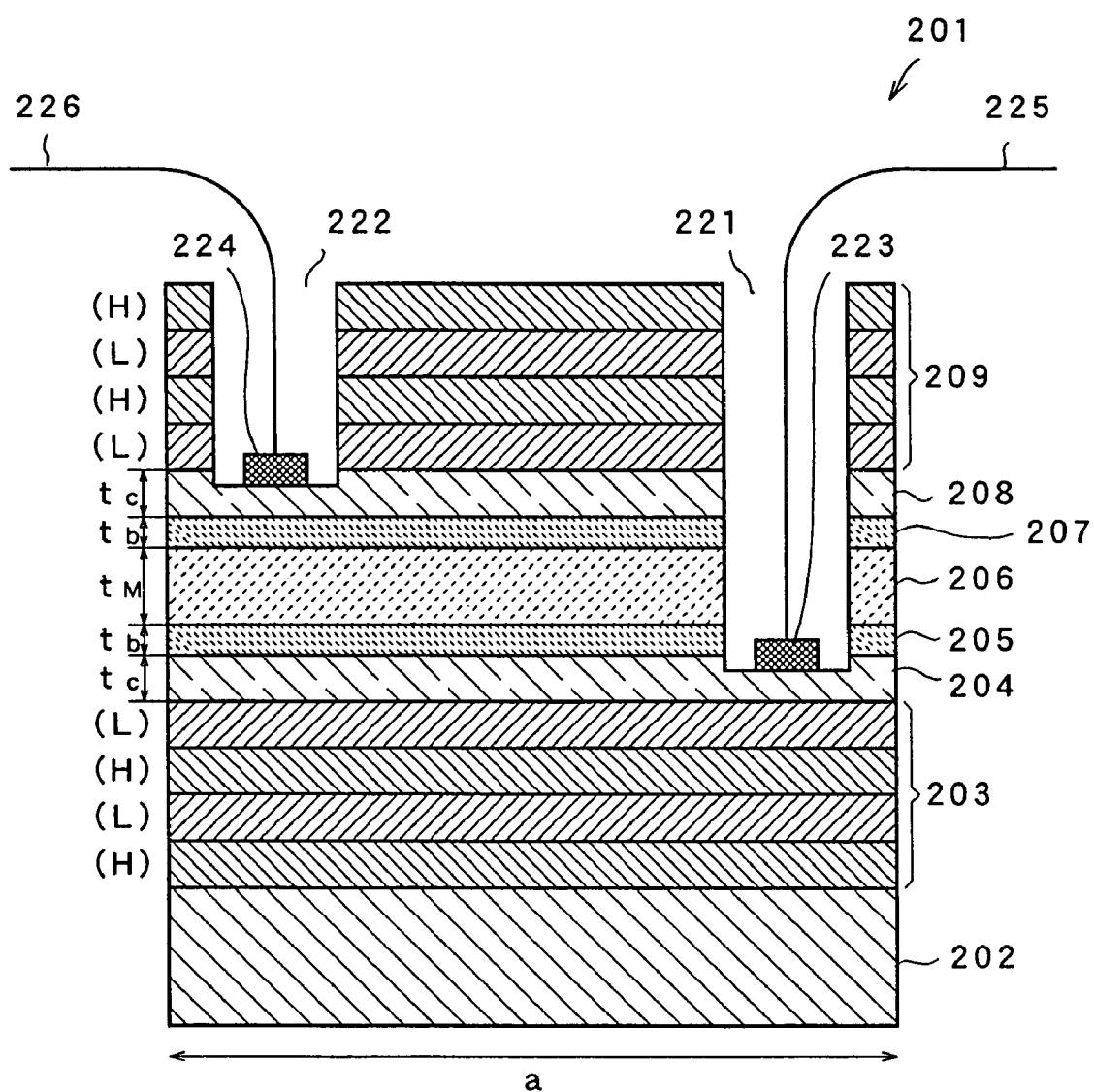
FIG. 9 is a cross-sectional view obtained when the optical element of FIG. 8 in the first embodiment is cut at a portion to which an electrode is connected.

FIG. 9 shows a cross-sectional structure obtained when the optical element shown in FIG. 8 is cut at a portion to which an electrode is connected. Here, the coupling layer 210 and the voltage source 211 shown in FIG. 8 are not shown in the figure. The dimension of the optical element 201 having a rectangular parallelepiped shape, as shown within the face of this figure, is indicated by a. The dimension of the rectangular portion obtained by cutting it in a direction perpendicular to the face of this figure is indicated by b. Here, holes 221 and 222, which respectively reach the first transparent conductive film 204 and the second transparent conductive film 208, are formed in the second mirror stack layer 209, by using ion-milling processes, etching processes and the like. First and second metal electrodes 223 and 224 are formed on the bottoms of these holes. Each of these first and second metal electrodes 223 and 224 has a square shape with two sides of d×e. The first and second metal electrodes 223 and 224 are connected to the voltage source 211 shown in FIG. 8 via the lead wires 225 and 226.

It supposes that resistivities of the transparent conductive films 204 and 208 as well as the conductive buffer layers 205 and 207 in the optical element 201 are respectively $\rho_C$ and $\rho_b$ [Ωcm]. Moreover, it also supposes that the thicknesses of the transparent conductive films 204 and 208 at the portions of the metal electrodes 223 and 224 are approximated by the same value as the thickness of the formed film, and indicated by $t_C$. Moreover, the thickness of the conductive buffer layers 205 and 207 is set to $t_b$, and the film thickness of the electrooptical film 206 is set to $t_M$.

In the above-mentioned case, the respective resistance value $R_C$ of the upper side transparent conductive film and resistance value $R_b$ of the upper side conductive buffer layer 207 on the upper portion thereof, are given by the following equations (14) and (15):

$$R_C = \rho_C (t_C/d \cdot e) \qquad (14)$$

$$R_b = \rho_b \cdot a/(b \cdot t_b) \qquad (15).$$

Moreover, the capacitance $C_S$ exerted in the electrooptical film that forms the spacer layer is given by the following equation (16):

$$C_S = \epsilon_r \cdot \epsilon_0 \cdot (a \cdot b/t_M) \qquad (16).$$

Here, symbol $\epsilon_r$ represents a relative dielectric constant of the dielectric material which forms the spacer layer, and symbol $\epsilon_0$ represents the dielectric constant of the vacuum.

In the figure, the resistance value of the first transparent conductive film 204 on the lower side is approximated as almost the same as the resistance value of the second transparent conductive film 208. Since the conductive buffer layers 205 and 207 are made in contact with both of the surfaces of the spacer layer 206, the composite resistance value R is given by the following equation (17), when approximated as having the same physical property value.

$$R = 2(R_C + R_b) \qquad (17)$$

Therefore, the frequency response band $f_C$ of the lumped constant type is given by the next equation (18).

$$f_C = 1/(\pi RC) \qquad (18)$$

Moreover, the response time τ is given by the following equation (19).

$$\tau = 1/f_C \qquad (19)$$

To reduce the resistance and capacitance results in high-speed response.

With respect to the spacer layer of the present invention, a polycrystal film, an oriented film or an epitaxial film, except for the amorphous film and the multiphase film, can be used.

Upon designing multilayer films for forming the filter, the film designing software which is marketed at present can be used. Examples thereof include TFCalc (Software Spectra, Inc.) and Essential Macleod (Thin-Film Center, Inc.), which are mainly used in the optical communication industry and are applicable to the present invention in the same manner.

The advantages of the optical element 201 of the present embodiment are summarized as follows:

(1) By altering a film design, it is possible to achieve a tunable optical filter which has a desired bandpass width and a wavelength signal eliminating characteristic for the other signals having different wavelengths.

(2) Because it adopts a tunable method by the use of refractive index control, no mechanical driving part is required, making it possible to provide superior reliability.

(3) For example, in the case of realizing a tunable optical filter by using mechanical driving processes, the resulting response speed is set to about 0.1 to 1 second; however, the optical element 201 of the present embodiment achieves a response speed, for example, not less than 1 million times faster than the above-mentioned response speed, so that the wavelength can be varied, for example, at a speed of not more than μs (micro second).

(4) In the case of a tunable bandpass filter that uses a conventional film-thickness gradient, the size of the device as a whole is generally as large as 30×30×80 mm³. In contrast, the size of the filter chip itself of the optical element 201 of the present embodiment is set to not more than 2 mm². Therefore, the size of the device as a whole is made as small as 10×10×10 mm³, making it possible to provide a small-size device. The volume ratio is made as small as 1/70.

(5) The conventional tunable bandpass filter using a film-thickness gradient requires a mechanical driving part such as a shifting stage; however, the optical element 201 of the present embodiment only requires electrode terminals for use in application of a voltage so that it is possible to produce the entire device at low cost.

(6) In the case of the conventional tunable optical filter using liquid crystal, since a power source that supplies an AC driving current is required, it is not possible to fix the filter wavelength to a desired value; however, since the optical element 201 of the present embodiment can be DC-driven so that the filter wavelength is optionally fixed.

The application of the present invention is not intended to be limited to the bandpass filter, and the present invention is applied to almost all the optical elements that are used in the dielectric multilayer film structure, such as a reflection-reducing coating, high reflection mirror, lowpass filter, highpass filter and band elimination filter (rugate filter).

As shown in expression structure (12), the present embodiment uses a single cavity-type element. However, the present embodiment may be applied to an optical element of an m-multiplex cavity type in which a plurality of these cavities are stacked so that it can provide sharp filter characteristics, for example, as a bandpass filter. Since a characteristic controlling unit is installed in each of the cavities, an applied voltage is controlled for each of the cavities so that characteristic controlling operations for transmission of light rays, or the like, can be carried out for each of the cavities.

The following description discusses the structures of the respective layers. Here, in the optical element 201 of the present embodiment, a variety of materials, which are transparent within a wavelength range to be used (for example, optical crystals, optical glass, quartz, transparent plastics (or polymer materials), may be used as the substrate 202. With respect to the dielectric thin film that constitutes the first and second mirror stack layers 203 and 209, those materials that are selected from generally-used materials at present, and are transparent within a wavelength range to be used with a refractive index ranging from 1.23 to 5.67, may be used. Selection is made of the following optical materials: calcium fluoride $CaF_2$ (refractive index: 1.23), magnetism fluoride $MgF_2$ (refractive index: 1.38), silicon dioxide $SiO_2$ (refractive index: 1.46), magnesium oxide MgO (refractive index: 1.80), tantalum pentoxide $Ta_2O_5$ (refractive index: 2.15), niobium pentoxide $Nb_2O_5$ (refractive index: 2.24), titanium dioxide $TiO_2$ (refractive index: 2.45), zinc selenide ZnSe (refractive index: 2.40), lead terrarium PbTe (refractive index: 5.67), aluminum nitride AlN (refractive index: 1.94), silicon nitride $Si_3N_4$ (refractive index: 1.95), silicon Si (refractive index: 3.4) and germanium Ge (refractive index: 4.0). When an optical thin film is formed by using any of these materials, the various film-forming methods as described earlier may be used.

Here, the conductive buffer layer is made of at least one material selected from the group consisting of a metal material, an oxide material, a nitride material and an alloy material with its thickness ranging from 0.1 nm to 100 nm, and has resistivity of not more than $10^{-2}$ $\Omega$cm.

In particular, when the metal material is used, examples thereof include: Au (gold) (lattice constant:. 4.078 angstroms), Ag (silver) (lattice constant: 4.086 angstroms), Pt (platinum) (lattice constant: 3.924 angstroms), Ir (iridium) (lattice constant: 3.939 angstroms), Al (aluminum) (lattice constant: 4.050 angstroms), Ni (nickel) (lattice constant: 3.524 angstroms), Cu (copper) (lattice constant: 3.615 angstroms), Nb (niobium) (lattice constant: 3.301 angstroms), V (vanadium) (lattice constant: 3.027 angstroms), Si (silicon) (lattice constant: 5.431 angstroms), Ge (germanium) (lattice constant: 5.658 angstroms), W(tungsten) (lattice constant: 3.1652 angstroms), Mo (molibudenum) (lattice constant: 3.147 angstroms), Bi (bismuth) (lattice constant: 4.546 angstroms, 11.860 angstroms), Be (beryllium) (lattice constant: 2.268 angstroms, 3.5942 angstroms), Mg (magnesium) (lattice constant: 3.209 angstroms, 5.210 angstroms), Sb (antimony) (lattice constant: 4.307 angstroms, 11.273 angstroms), In (indium) (lattice constant: 3.252 angstroms, 4.946 angstroms), Ta (tantalum) (lattice constant: $\alpha$-type 3.306 angstroms, $\beta$-type 10.194 angstroms, 5.313 angstroms), Ti (titanium) (lattice constant: $\alpha$-type 2.950 angstroms, 4.6833 angstroms, $\beta$-type 3.307 angstroms), Sn (tin) (lattice constant: $\alpha$-type 6.504 angstroms, $\beta$-type 5.831 angstroms, 3.181 angstroms), Fe (iron) (lattice constant: $\alpha$-type 2.866 angstroms, $\gamma$-type 3.647 angstroms, $\delta$-type 2.9315 angstroms) and Mn (manganese) (lattice constant: $\alpha$-type 8.9122 angstroms, $\beta$-type 6.470 angstroms, $\gamma$-type 3.863 angstroms).

In the case of the oxide material, when described based upon crystal structure classifications, examples thereof include those having a perovskite structure $ARO_3$ (A=Ca, Sr, Ba), (R=Ru, V, Mo, Co, Ir, Cr), such as $LaRO_3$, (R=Ti, Ni), $La_XSr_{1-X}CoO_3$ and $ReO_3$, those having NaCl structure, such as NbO, NdO, SmO, LaO, TiO, VO and EuO, those having a rutile structure such as $RuO_2$, $IrO_2$, $OsO_2$, $RhO_2$, $ReO_2$, $MoO_2$, $CrO_2$, $WO_2$, $SnO_2$ and $MnO_2$, those having a corundum structure such as $V_2O_3$ and $Ti_2O_3$, those having a spinel structure such as $LiTi_2O_4$, $LiV_2O_4$ and $Fe_3O_4$, those having a pyrochlore structure such as $Pb_2R_2O_7$ (R=Ir, Os, Ru), $Tl_2R_2O_7$ (R=Ir, Os, Mn) and $Bi_2R_2O_7$ (R=Ru, Ir, Rh), and other materials such as $(La_XSr_{1-X})_2CuO_4$, $YBa_2Cu_3O_{7-X}$ and $Bi_2Sr_2Ca_{n-1}Cu_nO_{2n+4}$. The lattice constant of each of these oxide materials is set in a range from 2 to 15 angstroms. In addition to these, examples of the nitride materials include AN (A=Ti, Nb, Ta) and the like. Moreover, conductive thin films made of alloy materials such as $Nb_3R$ (R=Ge, Sn, Si), ACr (A=Ni, Cr, Ti) may be used.

Here, with respect to the conductive buffer layers 205 and 207, those materials having a lattice constant in the vicinity of that of an electrooptical film used as the spacer layer 206 are preferably used so as to allow epitaxial growth of the electrooptical film. The lattice constants may be matched in the high order; however, more preferably, they are matched based upon the basic order. The basic-order matching refers to the case that a conductive buffer layer forming a base layer and an electrooptical film to be formed thereon are made in contact with each other in the same orientation (for example, (001) or the like) with the lattice constants being matched. The high-order matching refers to the case that, for example, on a base conductive buffer layer having an orientation (002), an epitaxial growth having an orientation (110) is formed, with the lattice constant of the base thin film having the orientation (002) and the lattice constant having the orientation (110) of the electrooptical film formed thereon being matched with each other.

In the case where the lattice constants are different from each other greatly, point defects, transition and the like are generated by the lattice distortion to cause degradation in the film quality. With respect to the conditions for the conductive buffer layer, in addition to the above-mentioned conditions, a conductive thin film having resistivity of not more than $10^{-2}$ $\Omega$cm at room temperature is preferably used, in order to improve the high-speed responding property. In this case, although it also depends on the capacitance of an electrooptical thin film forming the spacer layer and the shape and size of an element, a high-speed property of not less than 1 kHz is achieved. Moreover, the oxide conductive film, formed by $RuO_2$, $IrO_2$, $SrRuO_3$, $(La_XSr_{1-X})_2CuO_4$, $YBa_2Cu_3O_{7-X}$, $Bi_2Sr_2Ca_{n-1}Cu_nO_{2n+4}$ or the like, is superior in fatigue durability against repetitive voltage cycles. Therefore, this makes it possible to prevent "coming-out" losses of oxygen ions in an electrooptical film forming the spacer layer, and also to withstand the number of repetitions of not less than $10^{12}$.

In order to obtain a wide tunable range with a small insertion loss, it is important to properly select the conductive buffer layer. In the case where the film thickness $t_b$ of the conductive buffer layer is thick, although this easily allows the electrooptical film formed thereon to have an epitaxial growth, this state, in contrast, causes an increase in absorption loss in the conductive buffer layer, resulting in an increase in the filter insertion loss. In order to reduce the loss, a metal material and a conductive material such as an oxide or a nitride, are used in the conductive buffer layer. The material is desirably designed so that the optical electric-field strength amplitude inside the conductive buffer layer is made sufficiently small so as to form a part of "knot" of the wave; thus, its optical length is desirably made small. This corresponds to the fact, supposing that the complex index of refraction is set to $n_C=n-ik$ (where i represents an imaginary number), the real part of complex index of refraction, $n=\mathrm{Re}\,[n_C]$, is small. Moreover, since the imaginary part, $k=\mathrm{Im}\,[n_C]$, is a damping coefficient that is proportional to the loss inside the film, this is also desirably set to a small value. With respect to the electrooptical film member of the perovskite structure $ABO_3$ type, for example, Ag (silver) is used as the conductive buffer layer. Complex indexes of refraction of Ag, Au and Pt thin-films that are typical conductive thin films are respectively given as 0.129–i6.83, 0.54–i11.2, and 3.5–i5.8, within wavelengths of 1 to 2 μm. This clearly shows that the example includes Ag thin-films.

Upon forming an epitaxial film, the film is formed at a high film-forming temperature of not less than 400° C. During film-forming processes or cooling processes after the film formation, damages such as cracks tend to occur due to a film stress that is exerted between the substrate and the multilayer films or between the multilayer films. This problem can be avoided by using conductive buffer layers having coefficients of thermal expansion close to each other or by selecting a substrate having a coefficient of thermal expansion that is close to that of the multilayer film. Moreover, in an attempt to minimize the temperature shift of the filter center wavelength under a constant voltage in the environment atmosphere, a substrate having an optimal coefficient of thermal expansion needs to be selected; thus, it becomes possible to achieve an optical element, such as a tunable optical filter, that is superior in the temperature stability.

The spacer layer 206 is formed as an oxide dielectric thin film having a primary or secondary electrooptic effect that is vapor-deposited on a predetermined layer. The film structure of the spacer layer 206 is either a polycrystal film, an oriented film or an epitaxial film, with a thickness ranging from 10 nm to 50 μm.

When the spacer layer 206 has a thickness within this range, the resulting layer is used for an optical element, such as a tunable optical filter, that is allowed to function from an ultraviolet range with a wavelength of 400 nm up to an infrared range. In order to obtain an electrooptical coefficient that is equivalent to single crystal, the epitaxial film is preferably used; however, even the polycrystal film and the oriented film are also allowed to exert electrooptic effects.

With respect to the oxide dielectric material having a primary or secondary electrooptic effect in this optical element, the following material may be used: $Pb_{1-X}La_X(Zr_{1-Y}Ti_Y)_{1-X/4}O_3$, $(0 \leq X<1.0, 0 \leq Y \leq 1.0)$.

When the conditions indicated by the bracket are satisfied, the Curie temperature is adjusted by adjusting the La added amount and the Zr/Ti ratio; thus, the material is allowed to exhibit a ferroelectric phase having a primary electrooptic effect and a paraelectric phase having a secondary electrooptic effect in a temperature range from −40° C. to +85° C., which includes room temperature.

Moreover, by adding mutually different ions thereto, it is possible to improve the temperature characteristic and P (dielectric polarization)-E (electric field) hysteresis characteristic, and also to adjust electrooptic characteristics such as the dielectric constant and dielectric loss. In addition to these, it is also possible to adjust the grain size in the film.

For this purpose, by intentionally adding ions having the same ion radius or different ion radius, such as Ca, Sr, Ba, Mg, K and Na, to one portion of Pb, or by replacing one portion of Zr and Ti of B site with a single material or a plurality of combinations selected from the group consisting of Mg, Nb, Mn, W, Bi, Ce, Fe, Cr, Ta, Sc, Co, Zr, Sb, Zn, Cd, Y, Ni, Te, Al and In, the characteristics thereof can be improved.

With respect to the oxide dielectric material that forms a spacer layer and has a primary or secondary electrooptic effect in this optical element, $Sr_XBa_{1-X}TiO_3$, $(0 \leq X \leq 1.0)$ may be used.

When X satisfies the conditions indicated by the bracket in this formula, the Curie temperature can be adjusted in a temperature range from −40° C. to +85° C. including room temperature, by adjusting the Ba/Sr ratio. Thus, the material is allowed to exhibit a ferroelectric phase having a primary electrooptic effect and a paraelectric phase having a secondary electrooptic effect. In this material system also, in the same manner as described above, by adding mutually different ions thereto, it becomes possible to adjust temperature characteristics and electrooptic characteristics such as the dielectric constant and dielectric loss, and it is also possible to adjust the grain size in the film.

With respect to the oxide dielectric material having a primary or secondary electrooptic effect in this optical element $KTa_XNb_{1-X}O_3$, $(0 \leq X \leq 1.0)$ may be used.

When X satisfies the conditions indicated by the bracket, the Curie temperature can be adjusted in a temperature range from −40° C. to +85° C. including room temperature, by adjusting the Ta/Nb ratio Thus, the material is allowed to exhibit a ferroelectric phase having a primary electrooptic effect and a paraelectric phase having a secondary electrooptic effect. In this material system also, in the same manner as described above, by adding mutually different ions thereto, it becomes possible to adjust temperature characteristics and electrooptic characteristics such as the dielectric constant and dielectric loss, and it is also possible to adjust the grain size in the film.

In addition to these, with respect to the spacer layer, $LiNbO_3$ (electrooptic coefficient r=31 pm/V, lattice constant: 5.148 angstroms, 13.863 angstroms) and $LiTaO_3$ (electrooptic coefficient r=30 pm/V, lattice constant: 5.154 angstroms, 13.784 angstroms), which have a pseudo-ilumenite structure that exerts a primary electrooptic effect, and $BaNaNbO_{15}$ (BNN) (electrooptic coefficient r=570 pm/V, lattice constant: 17.626 angstroms, 17.592 angstroms, 7.995 angstroms) and $Sr_{1-X}Ba_XNb_2O_6$ (SBN) (electrooptic coefficient r=1340 pm/V, lattice constant: 12.49 angstroms, 3.95 angstroms), which have a tungsten-bronze structure, may be used.

Moreover, a single or multiplex cavity-type tunable optical filter forms one mode of the optical element in accordance with the present invention. As will be described later, this tunable filter may be used as an optical drop module, an optical add-drop module and a tunable light source.

(Second Embodiment)

Figure 10:
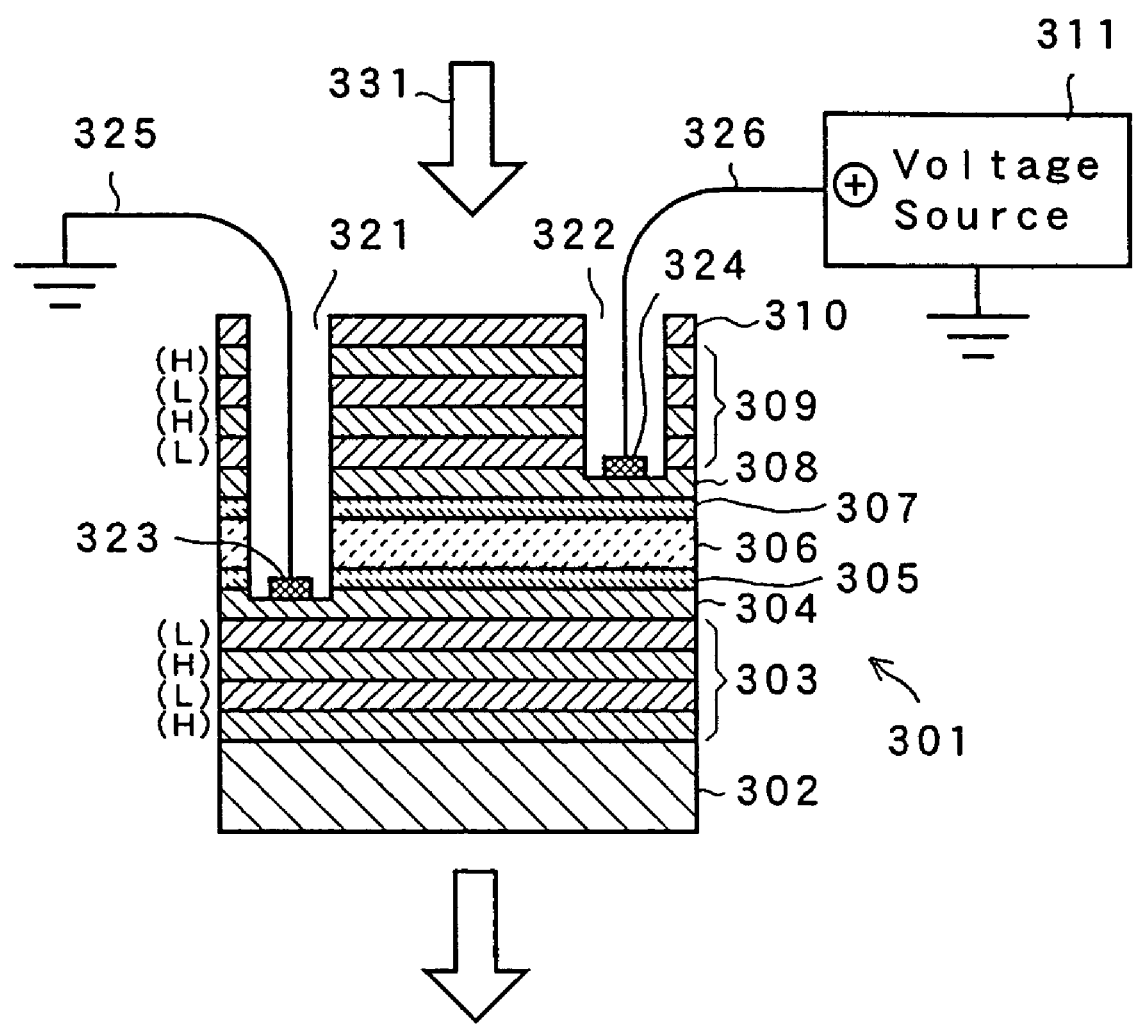
FIG. 10 is a cross-sectional view that shows a single cavity-type tunable bandpass filter in accordance with a second embodiment.

The following description will discuss an embodiment in which the above-mentioned optical element is practically applied to a bandpass filter, in detail. FIG. 10 shows a structure of a single cavity-type tunable bandpass filter in accordance with a second embodiment of the present invention. This single cavity-type tunable bandpass filter 301 of the present embodiment has a structure in that a first mirror stack layer 303 is formed on a substrate 302; a first transparent conductive film 304, a conductive buffer layer 305, a spacer layer 306, a conductive buffer layer 307 and a second transparent conductive film 308 are stacked thereon in succession; and a second mirror stack layer 309 is further placed thereon. A coupling layer 310 is placed on the second mirror stack layer 309. Holes 321 and 322, which reach the first transparent conductive film 304 and the second transparent conductive film 308 are formed through ion milling processes, etching processes and the like. A first metal electrode 323 is formed on the first transparent conductive film 304. A second metal electrode 324 is formed on the second transparent conductive film 308. A lead wire 325 one end of which is connected to the first metal electrode 323 has the other end connected to ground, and a lead wire 326 one end of which is connected to the second metal electrode 324 has the other end connected to a plus-side output terminal of a voltage source 311. In the single cavity-type tunable bandpass filter 301 of this type, when, for example, light rays 331 are made incident on the coupling layer 310, transmitted light rays 332 with the transmitted wavelengths being changed are obtained from the substrate 302 side.

This single cavity-type tunable bandpass filter 301 has a design wavelength $\lambda_0$ of 1550 nm. A synthesized quartz substrate (refractive index: 1.45) is used as the substrate 302. A dielectric thin film made of $Nb_2O_5$ (refractive index $n_H$=2.22) is used as a high refractive index dielectric thin film H that forms the first and second mirror stack layers 303 and 309, and an $SiO_2$ film (refractive index $n_L$=1.48) is used as a low refractive index dielectric thin film L. Moreover, with respect to the composite conductive layer, $AgSbO_3$ films (hereinafter, referred to as ASO, refractive index $n_C$=2.0) are used as the transparent conductive films 304 and 308. This ASO film is allowed to function as a transparent conductive film in the vicinity of a wavelength of 1550 nm, and has resistivity of 10 Ωcm. Ag films are used as the conductive buffer layers 305 and 307. The Ag film has resistivity of $1.6\times10^{-6}$ Ωcm.

With respect to the spacer layer 306, a thin film, made of $Pb_{1-X}La_X(Zr_{1-Y}Ti_Y)_{1-X/4}O_3$ having the primary electrooptic effect (where X=0.088, Y=0.35) (hereinafter, referred to as PLZT), is used. Here, the refractive index ($n_M$) of this PLZT thin film is 2.5. Air having a refractive index of 1.0 is used as the external medium. The lattice constant of the Ag film is 4.086 angstroms and that of the PLZT film is 4.1 angstroms. The lattice mismatching rate M is 0.34%; thus, these films satisfy conditions for forming a superior epitaxial film.

Supposing that the film structure of the tunable bandpass filter 301 is represented by B, this is represented by the following expression structure (20):

$$B = (HL)^7 (CE) 8M (EC)(LH)^7 \qquad (20).$$

Here, the film thickness of each of the conductive buffer layers 305 and 307 is 14 nm.

Figure 11A:

FIGS. 11A to 11H show a manufacturing method for the single cavity-type tunable bandpass filter of the present embodiment. In the first process as shown in FIG. 11A, a substrate 302 made of a BK 7 glass substrate having a clean surface is prepared. The substrate size is set to 10 mm×10 mm.

Figure 11B:
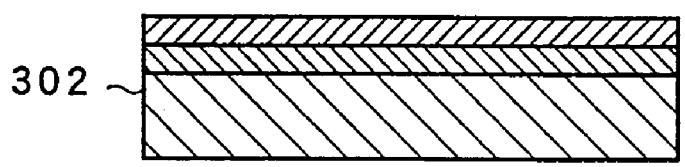

In the second process as shown in FIG. 11B, a film-forming temperature is set at 600° C. in a vacuum chamber that has been sufficiently vacuumed, by using a magnetron sputtering process. Then, a dielectric thin film serving as the high refractive index dielectric thin film H, that is, an $Nb_2O_5$ film, is formed on one surface of the substrate 302 having a size of $10\times10\times t_2$ mm$^3$ and an $SiO_2$ film serving as the low refractive index dielectric thin film L is formed thereon. These dielectric thin films, that is, $Nb_2O_5$ films and $SiO_2$ films, are successively stacked thereon alternately to form seven layers "$(HL)^7$" of the first mirror stack layers 303. The physical film thicknesses of the ¼-wavelength of the design wavelength are as follows:

$d_H$=175 nm $d_L$=262 nm.

Figure 11C:
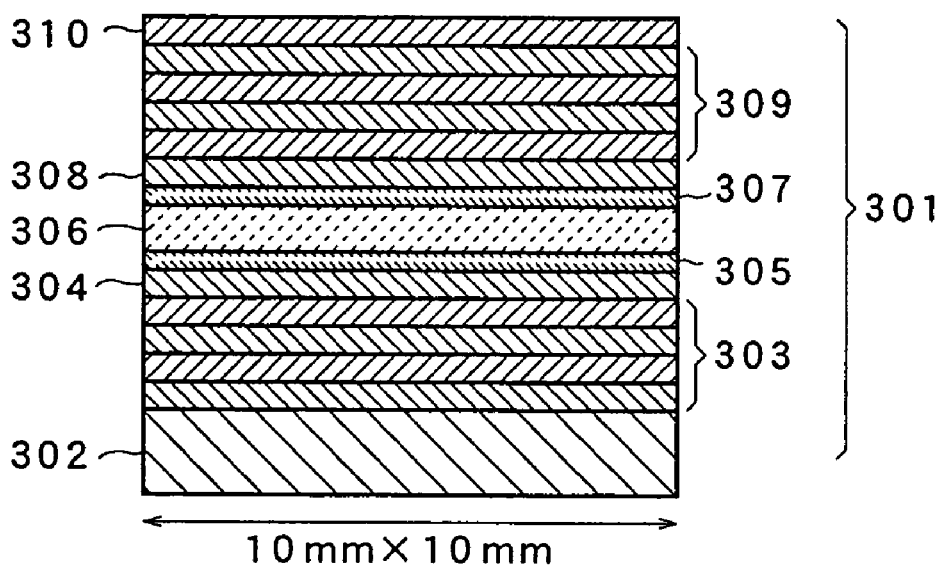

FIG. 11C shows the third process. An ASO film, which forms a transparent conductive film 304, is vapor-deposited on the first mirror stack layer 303 with a thickness of 1C ($t_C$=194 nm). Thereafter, an Ag film is formed as the conductive buffer layer 305 with a thickness of 14 nm. Successively, a PLZT film is stacked thereon as the spacer layer 306 with a thickness of 8M ($t_M$=1.24 µm). In the same manner, an Ag film is stacked on the upper face as the conductive buffer layer 307 with a thickness of 14 nm, and an ASO film that forms the transparent conductive film 308 is vapor-deposited thereon with a thickness of 1C. Successively, the second mirror stack layer 309 constituted by seven layers "$(LH)^7$" is formed. Lastly, the low refractive index dielectric thin film L is vapor-deposited with a thickness of 262 nm, that is, a physical film thicknesses of the ¼-wavelength, as the coupling layer 310.

When the film thus formed was evaluated by using the θ-2θX ray diffraction pattern, a single phase with a single surface index (002) was confirmed so that the resulting spacer layer was confirmed to be an epitaxial thin film. Here, upon monitoring the film thickness, a single wavelength laser having a wavelength of 1550 nm is perpendicularly made incident on the substrate 302, and the transmissibility in the film is monitored by using an optical film-thickness monitor. In the case where the film thickness is set to the physical film thickness of the ¼-wavelength during the film-forming processes, the transmissibility exhibits a maximum value or a minimum value so that it can carry out film-forming controlling processes with high precision. In the case of the spectral line width of the laser is not more than 0.01 nm, the film thickness precision of 0.1 nm is obtained.

Here, in the third process and thereafter of FIG. 11C, with respect to the first and second mirror stack layers 303 and 309, only the repetitive structures of the thin films L and the thin films H respectively corresponding to four layers are shown. This is to avoid complexity of the figure, and actually, total 14 layers "$(HL)^7\times2$" are stacked.

Figure 11D:
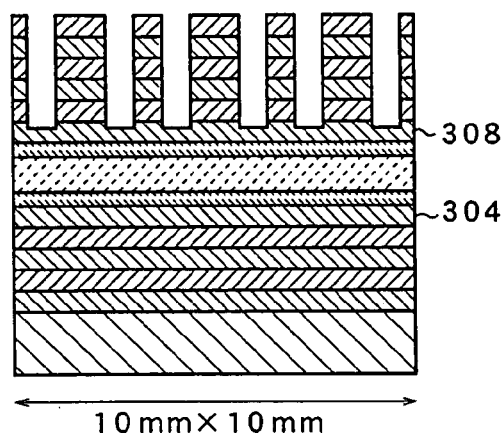
Figure 11E:
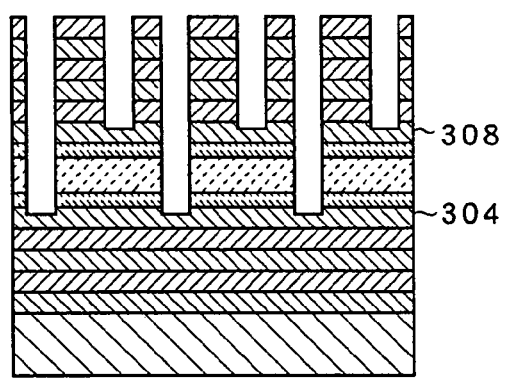

In the fourth process shown in FIG. 11D, the sequence proceeds to a process for forming electrodes. An etching process is carried out up to the upper face of the second transparent conductive film 308 through dry etching. Moreover, in the fifth process shown in FIG. 11E, an etching process is further carried out up to the upper face of the first transparent conductive film 304 on the other etching face of the paired etching faces. In the case of the etching, it becomes possible to control the quantity of etching with high precision by controlling the above-mentioned monitoring processes.

Figure 11F:
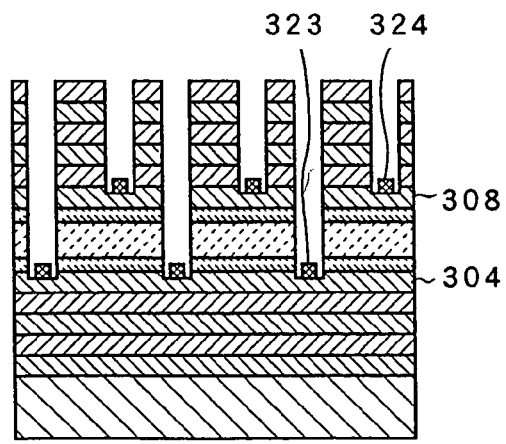

In the sixth process shown in FIG. 11F, metal electrodes 323 and 324 are formed on the first transparent conductive film 304 and the second transparent conductive film 308. With respect to the materials for the metal electrodes 323 and 324, a Ti/Au or Ti/Pt metal thin film, which has high adhesive strength, is formed. Ti is vapor-deposited with a thickness of 50 nm, and an Au or Pt thin film is stacked thereon with a thickness of 200 nm.

FIG. 11G is a diagram in which the coupling layer 310 of the single cavity-type tunable bandpass filter 301 is viewed from above, and in the seventh process, cutting processes into individual chips are carried out. In the cutting processes, this single cavity-type tunable bandpass filter 301 having a length of 10 mm in each of X and Y directions in the figure is divided into three portions in the respective length directions. In other words, the dividing processes are carried out so that, after the dividing processes, each width of portions divided at the respective positions shown by arrows 341 to 344 is allowed to have 2.5 mm in the Y direction or the X direction. In this manner, nine single cavity-type tunable bandpass filter chips 301A are cut and prepared.

FIG. 11H shows the eighth process. With respect to one of the single cavity-type tunable bandpass filter chips 301A obtained in the seventh process, lead wires 325 and 326 are wire-bonded to the corresponding metal electrodes 323 and 324. The other ends of the lead wires 325 and 326 are connected to a voltage source, not shown.

The following description will discuss a comparative example for use in comparison with the bandpass filter of the present embodiment. In the optical element 151 in accordance with this comparative example, a Fabry-Perot resonator structure represented by the following expression structure (21) in order to achieve a tunable property.

$$B = [(HL)^7 \, C \, 8M \, C(LH)^7 \, L] \quad (21)$$

Here, symbol C represents a conductive film, and symbol M represents a paraelectric material having an electrooptic effect. Each of these films C and M has a physical film thickness with the ¼-wavelength.

As clearly shown by this expression, this comparative example is the same as the second embodiment except that no conductive buffer layers 205 and 207 are installed.

Figure 12:
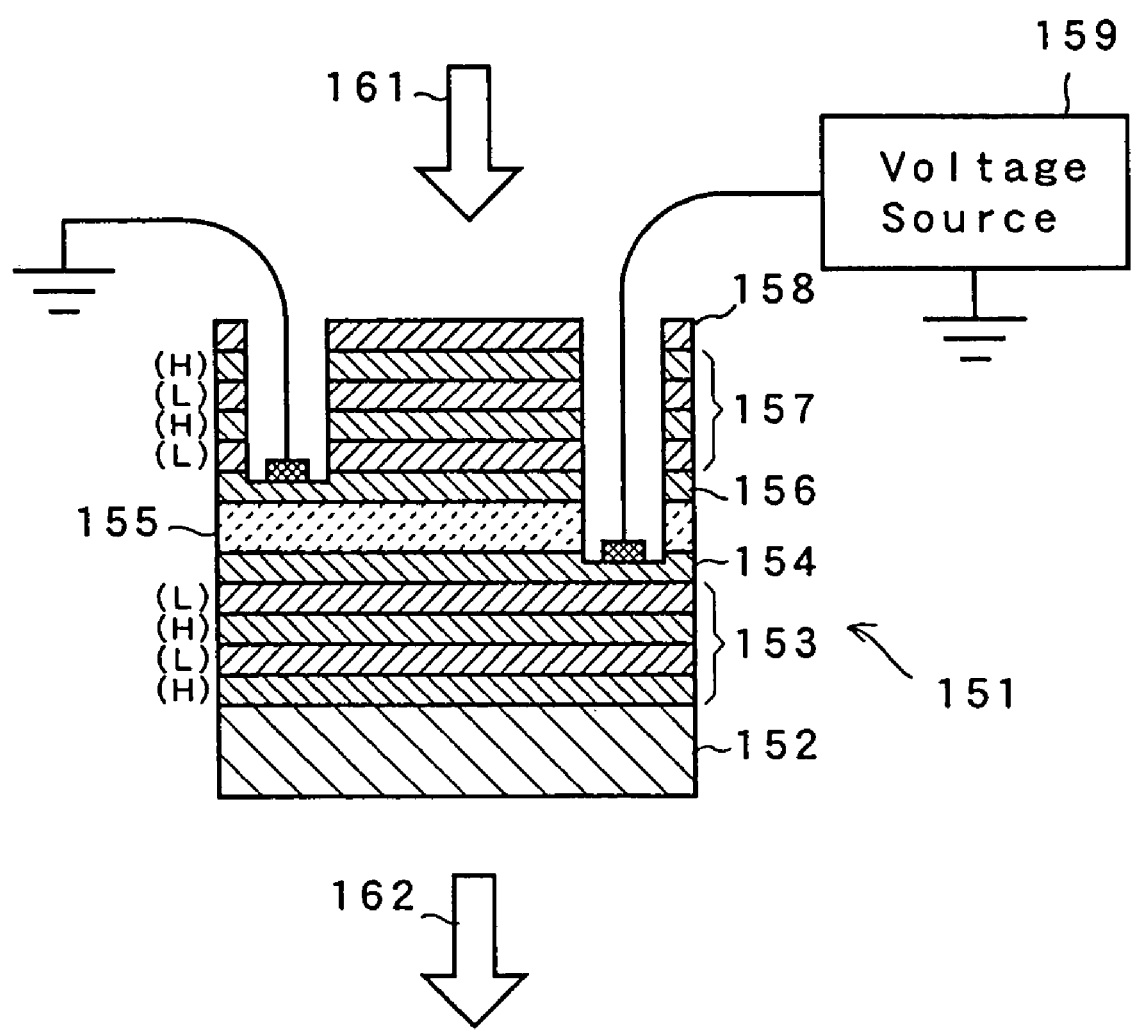
FIG. 12 is a schematic structural diagram that shows a single cavity-type tunable bandpass filter in accordance with a comparative example.

In the single cavity-type tunable bandpass filter 151 shown in FIG. 12, a voltage source 159 is connected between the first transparent conductive film 154 and the second transparent conductive film 156, and by varying a voltage V to be applied across these, the tunable property is achieved. The following description will discuss the frequency response in this case.

In the single cavity-type tunable bandpass filter 151, the conductive thin films 154 and 156, which are made in contact with the first and second mirror stack layers 153 and 157, have a finite electrical resistance value R, and the paraelectric layer 155 that has the secondary electrooptic coefficient and forms the spacer layer has a capacitance C. The time response is limited by the product of these values. Here, it supposes that the resistivity of the first and second conductive thin films 154 and 156 is ρ [Ωcm] and that the surface area of these is S. In this case, the resistance value R and the capacitance C are respectively represented by the following equations (22) and (23):

$$R = \rho(C/S) \quad (22)$$

$$C = \epsilon_r \cdot \epsilon_0 \cdot (S/8M) \quad (23).$$

Here, the symbol $\epsilon_r$ represents the relative dielectric constant of the paraelectric layer 155 that forms the spacer layer, and the symbol $\epsilon_0$ represents the vacuum dielectric constant.

Here, in the present specification, the respective terms are defined as follows.

"The polycrystal film" refers to a film state where, although it is in a single phase state, various surface indexes intermingle with one another based upon the θ-2θX ray diffraction pattern. In other words, it refers to those films in which the diffraction strength corresponding to the crystal azimuth is identified to be not less than 1% of the entire diffraction strength.

"The oriented film" refers to the case in which, in a polycrystal film, one surface index and its high-order peak appear on the θ-2θX ray diffraction pattern.

"The epitaxial film" refers to an oriented film which includes "an in-plane randomly oriented film", "an in-plane selectively oriented film", and "an in-plane oriented film" and the like. In "an in-plane randomly oriented film", in-plane crystal azimuths are randomly set depending on the respective crystal grains. In "an in-plane selectively oriented film", crystal grains, oriented in two or more kinds of specific directions, are present in a mixed manner. In "an in-plane oriented film", crystal grains are completely oriented in one direction, due to X-ray pole figure, RHEED (Reflection High-speed Electron-beam Diffraction), LEED (Low-speed Electron-beam Diffraction). In the case of the in-plane oriented film, a bulk electrooptic coefficient is substantially realized by a thin film; however, in the case of the other oriented films and polycrystal films, this is achieved when the electrooptic coefficient is reduced.

In the single cavity-type tunable bandpass filter 151 shown in FIG. 12, light rays 161 are made incident on a coupling layer 158 (low refractive index dielectric thin film L forming the uppermost layer) so that transmitted light rays 162 are obtained from the BK 7 glass substrate 152 side. Randomly-polarized light rays are perpendicularly made incident on this single cavity-type tunable bandpass filter 151 externally with a DC current voltage being applied in the thickness direction of the paraelectric layer 155 serving as the spacer layer. Then, only the light-ray components corresponding to the center wavelength of the tunable bandpass filer 151 are allowed to pass through the filter as the transmitted light rays 162.

Figure 13:
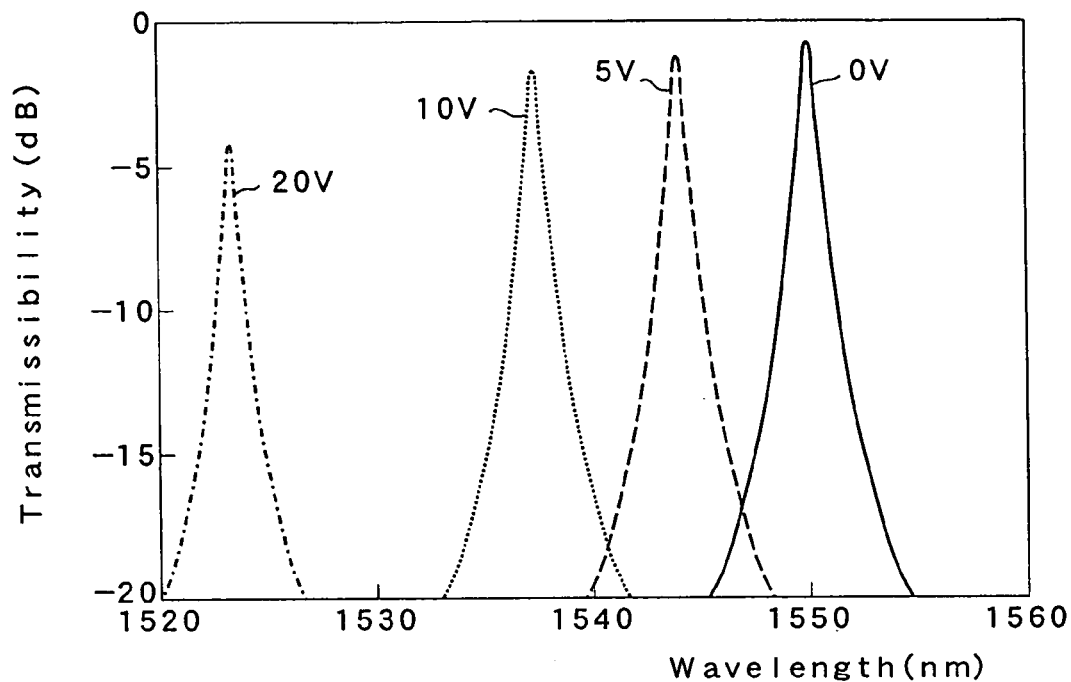
FIG. 13 is a performance mapping that shows a tunable characteristic of the single cavity-type tunable bandpass filter in accordance with the second embodiment.

FIG. 13 shows a tunable characteristic of the single cavity-type tunable bandpass filter in accordance with the second embodiment. As shown in FIG. 10, randomly-polarized light rays are perpendicularly made incident on the upper face of the tunable bandpass filter 301 externally as light rays 331. It is found that when, in this state, the output voltage of the voltage source 311 is changed, the transmission spectral characteristic of the tunable bandpass filter 301 changes. The insertion loss in the transmitted wavelength is not more than 1 dB, which is a superior loss characteristic. In the case of the applied voltage of 20 V, the amount of wavelength shift is −27 nm. This corresponds to a change of Δn=−0.076 in the refractive index. In accordance with this characteristic, the change is made in proportion to the first order of the applied voltage, and based upon equation (1), 600 pm/V is obtained as the first-order electrooptical coefficient $r_{13}$ (or the first-order electrooptical coefficient $r_{23}$). This corresponds to almost the same characteristic as the coefficient which has been reported with respect to the single crystal substrate. In the case of the tunable bandpass filter 301, the response speed of the sample is limited by the RC time constant. The time constant is given by the resistance value (R) of the composite conductive layer and the capacitance (C) of the PLZT dielectric material that forms the spacer layer. By using expression (19), the response time is 84 ns in the present embodiment.

Figure 14:
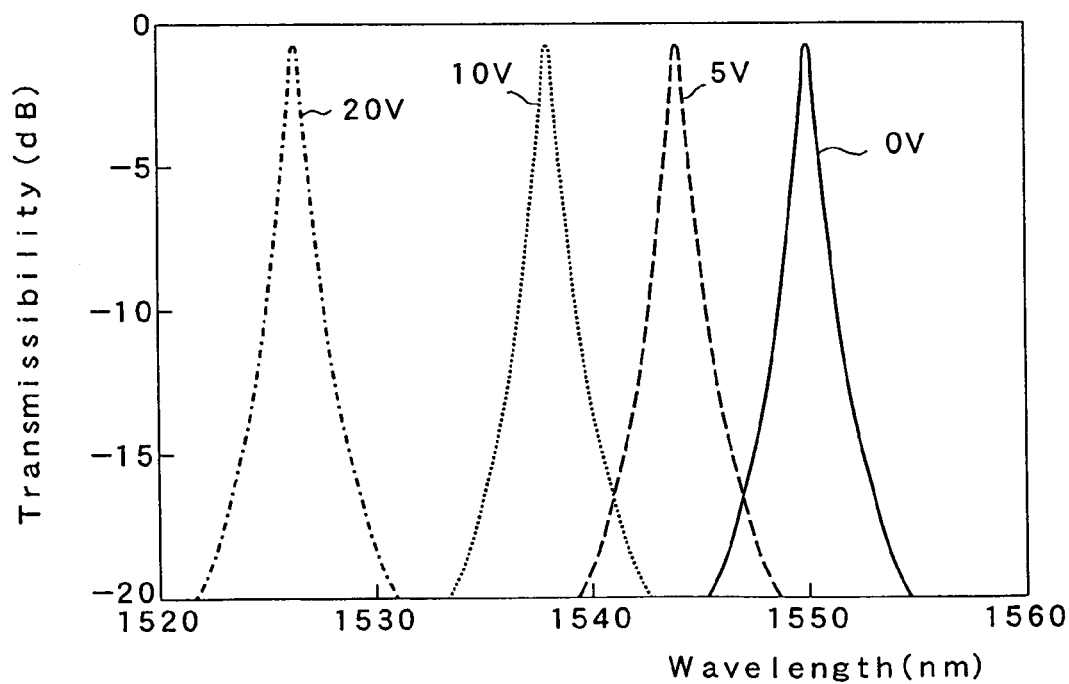
FIG. 14 is a performance mapping that shows a tunable characteristic of the tunable optical filter of the comparative example shown in FIG. 12.

FIG. 14 shows a tunable characteristic of the tunable optical filter 151 shown in FIG. 12. In the case of this tunable bandpass filter 151 also, randomly-polarized light rays are perpendicularly made incident on the upper face of the tunable bandpass filter 151 externally as incident light rays 161. In this state, DC voltages on four stages from 0 V to 20 V are applied in the thickness direction of the tunable bandpass filter 151 by using a voltage source 159 shown in FIG. 12. In this case also, as the applied voltage is switched, the transmission spectral characteristic of the tunable bandpass filter 151 changes.

FIG. 14 shows that the insertion loss in the transmitted wavelength is not more than 1 dB, which is a superior loss characteristic. In the case of the applied voltage of 20 V, the amount of wavelength shift is −24 nm. This corresponds to a change of Δn=−0.076 in the refractive index. This change is made in proportion to the first order of the applied voltage, and based upon equation (1), 600 pm/V is obtained as the first-order electrooptical coefficient $r_{13}$ (or the first-order electrooptical coefficient $r_{23}$). This corresponds to almost the same characteristic as the coefficient which has been reported with respect to the single crystal substrate. In the case of the tunable bandpass filter 151 shown in FIG. 12, the response speed of the sample is limited by the RC time constant. The time constant is given by the resistance value (R) of the ASO conductive film and the capacitance (C) of the PLZT dielectric material that forms the spacer layer. By using expression (18), the response time is 0.14 s in the tunable bandpass filter 151 shown in FIG. 12. The reason that the response time is long is because the resistance value of the conductive film is as great as 1 MΩ.

When the tunable bandpass filters 151 and 301 are compared with each other, in spite of the presence of the conductive buffer layers 305 and 307 using the Ag films, the same filter characteristic as the tunable bandpass filter 151 of the comparative example is achieved in the present embodiment. However, the bandpass filter 301 of the present embodiment has a particularly superior frequency response characteristic. This is because, in the case of the present embodiment, the resistance value of the composite conductive layer is greatly reduced to 0.59 Ω.

For this reason, in the present embodiment, it is not necessary to use an expensive high-voltage amplifier capable of high-speed response. Therefore, the tunable bandpass filter 301 is directly driven by using a high-speed IC chip in the 24 V standard derived from a personal computer or an electronic apparatus, thereby making it possible to provide an inexpensive, small-size tunable bandpass filter. Thus, it is possible to realize an inexpensive tunable bandpass filter having high reliability, and is operated within a tunable range of about 27 nm without using any mechanical driving parts.

Figure 15:
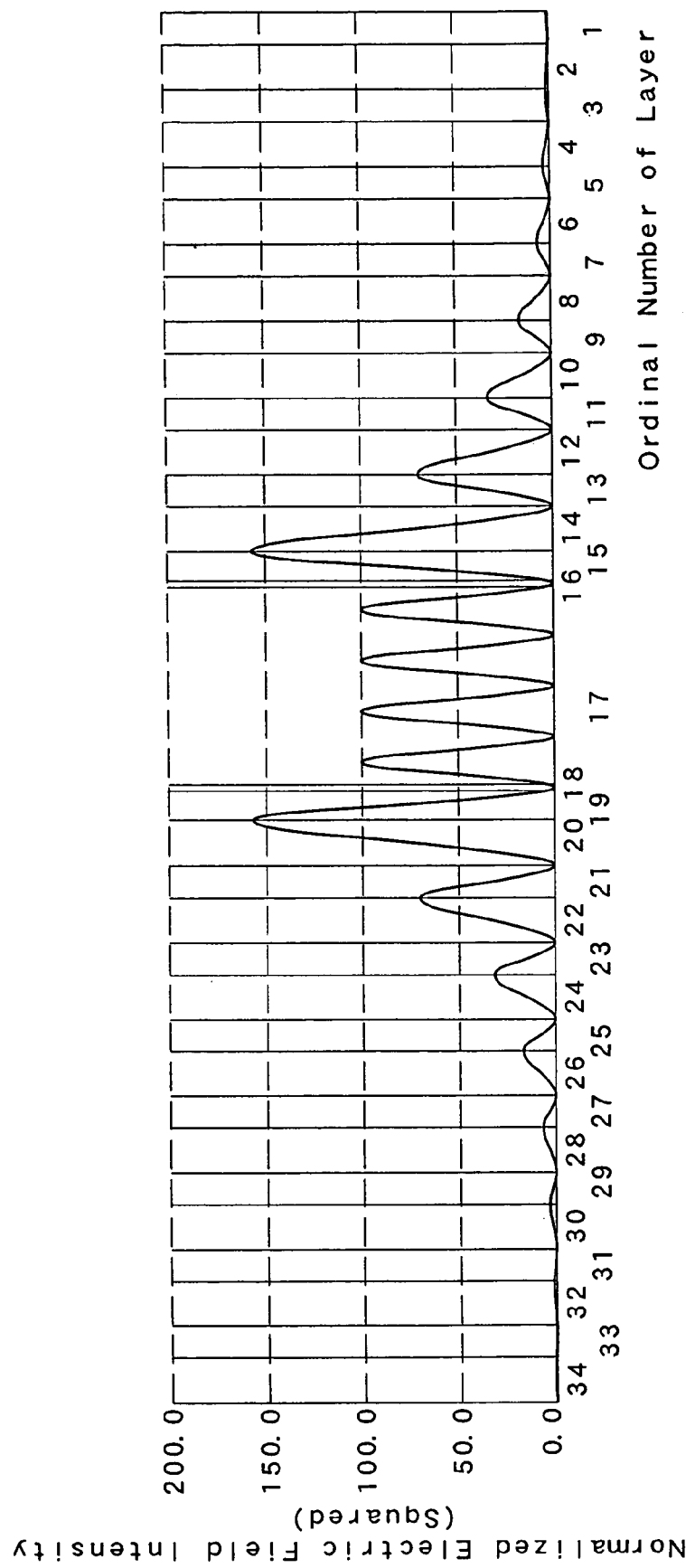
FIG. 15 is a performance mapping that shows the entire optical electric field intensity distribution inside a multilayer film of the single cavity-type tunable bandpass filter in accordance with the second embodiment.
Figure 16:
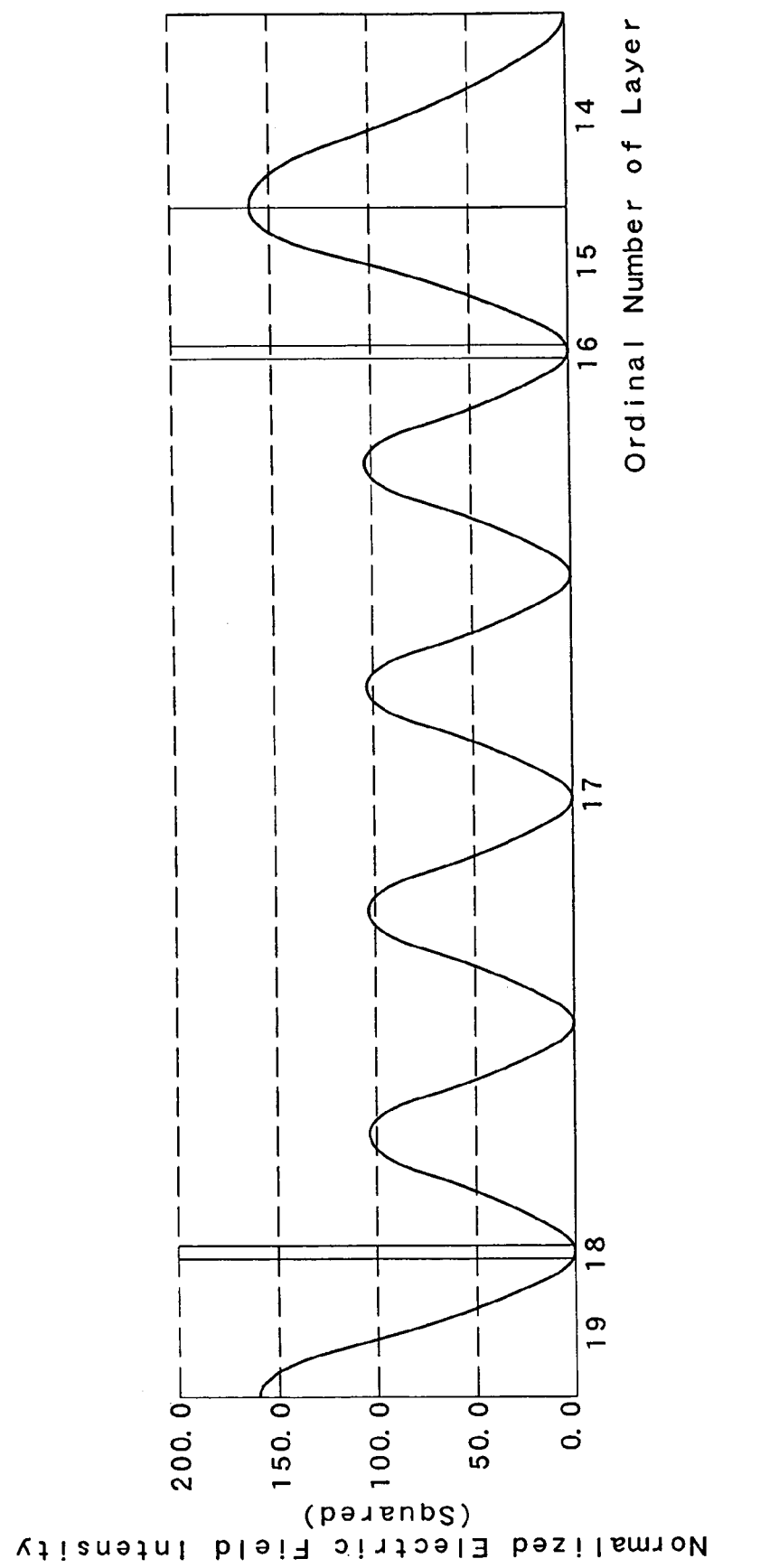
FIG. 16 is a performance mapping that shows an optical electric field intensity distribution in the vicinity of a spacer layer inside the multilayer film of the single cavity-type tunable bandpass filter in accordance with the second embodiment.

FIGS. 15 and 16 show optical electric field intensity distributions inside a multilayer film of the tunable bandpass filter 301 of the present embodiment. FIG. 15 shows an optical electric field intensity distribution inside the multilayer film indicated by the expression structure (20) of the present embodiment over the entire multilayer film. A layer, which is made in contact with the substrate 302 of FIG. 10, is a first layer indicated by FIG. "1" on the axis of abscissas in this figure, and the axis of abscissa indicates the ordinal number of the layer. In this figure, the axis of ordinate indicates the optical electric field intensity distribution inside the multilayer film, and the incident light intensity has been normalized in "1".

FIG. 16 is an enlarged view that shows a portion in the vicinity of the spacer layer 306 that serves as the electrooptical film of FIG. 15. Both of the ends of the spacer layer 306 that correspond to the seventeenth layer form "knots" in the electric field intensity amplitude, at which the level of the electric filed is zero. Ag films, which constitute conductive buffer layers 305 and 307 that correspond to the sixteenth layer and the eighteenth layer, are inserted to these portions. In spite of the fact that the Ag film with a great thickness of 14 nm is inserted, this arrangement allows a filter characteristic that is less susceptible to insertion loss.

Figure 17:
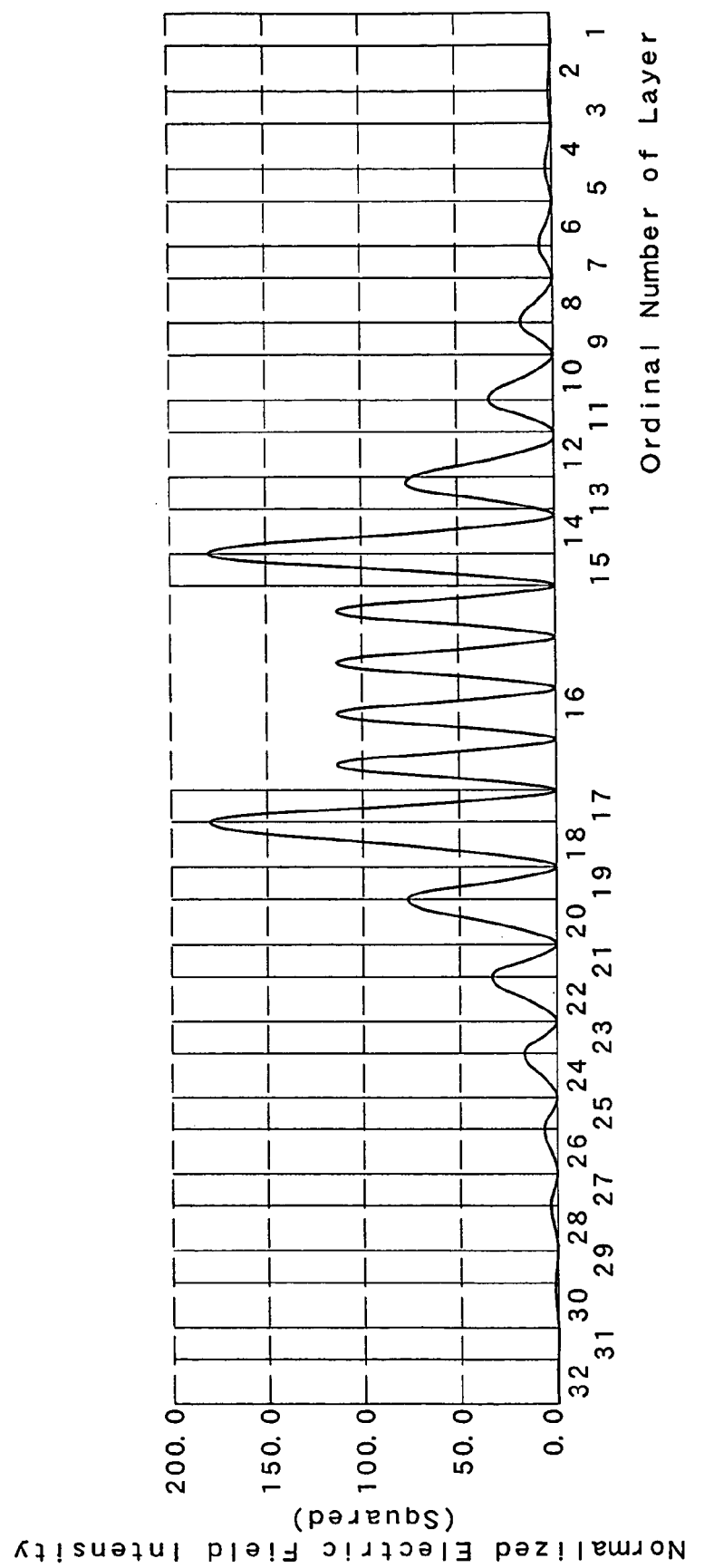
FIG. 17 is a performance mapping that shows the entire optical electric field intensity distribution inside a multilayer film of the tunable optical filter of the comparative example shown in FIG. 12.
Figure 18:
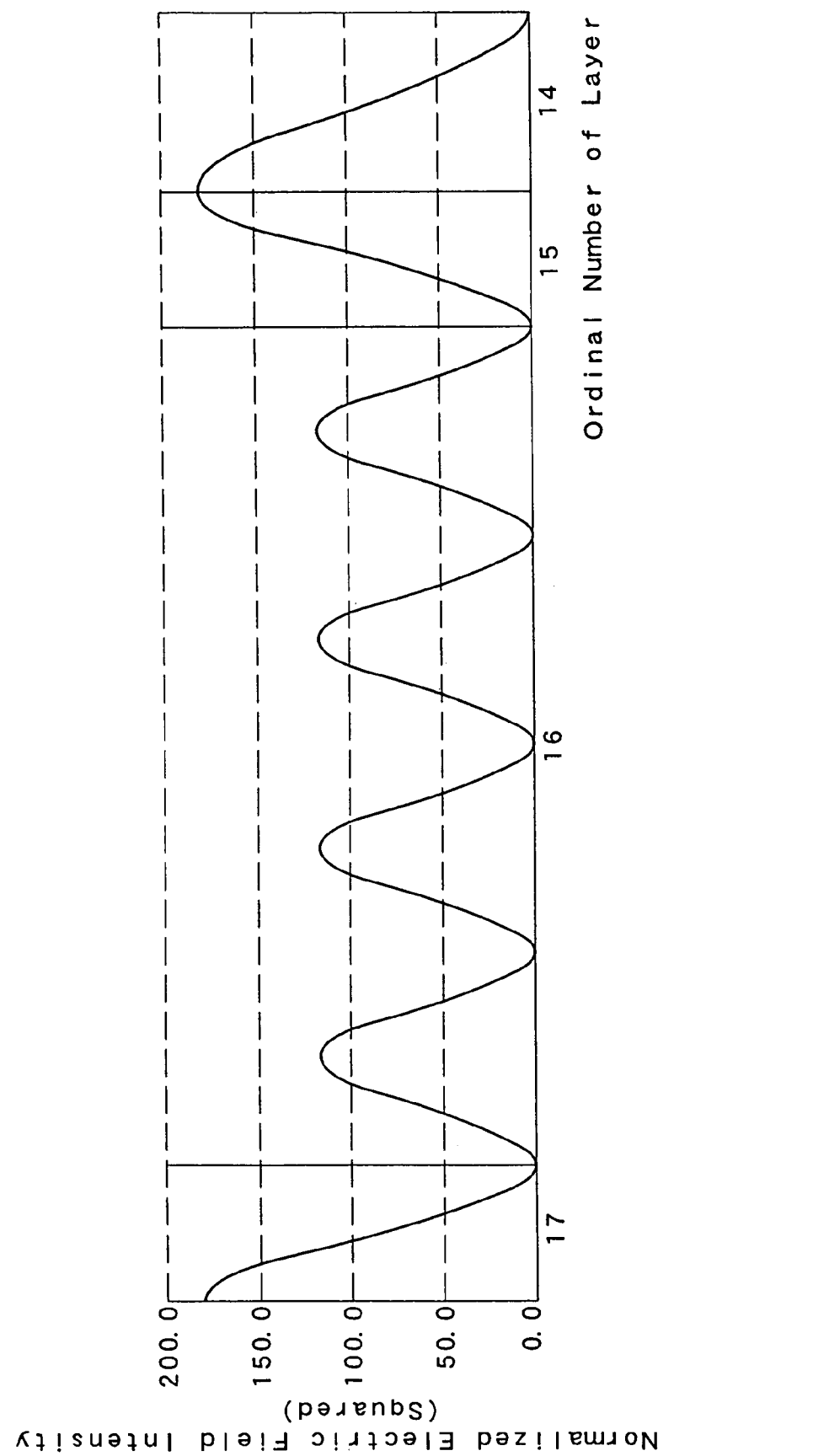
FIG. 18 is a performance mapping that shows an optical electric field intensity distribution in the vicinity of a spacer layer inside a multilayer film of the tunable optical filter of the comparative example shown in FIG. 12.

FIGS. 17 and 18 show optical electric field intensity distributions inside a multilayer film of the tunable bandpass filter 151 according to a comparative example without conductive buffer layers 305 and 307. Here, FIG. 17 shows an optical electric field intensity distribution inside the multilayer film of the optical filter 151 according to the comparative example, over the entire multilayer film. Here, a layer, which is made in contact with the substrate 152 of FIG. 12, is a first layer indicated by FIG. "1" on the axis of abscissa in FIG. 17.

FIG. 18 is an enlarged view that shows a portion in the vicinity of the spacer layer in the tunable optical filter shown in FIG. 12. Interface portions between the spacer layer 155 corresponding to the sixteenth layer and transparent conductive films 154 and 156 corresponding to fifteenth layer and seventeenth layer located on both of the sides thereof form "knots" in the electric field intensity amplitude, at which the level of the electric filed is zero.

When the tunable bandpass filters 301 and 151 are compared with each other by using FIGS. 15 to 18, the present embodiment has only an increase of 0.4 dB in the insertion loss as compared with the comparative example. In the structure of the present embodiment, however, as the tunable range increases, the insertion loss tends to increase as shown in the figure. This is because, in the conductive buffer layer, the optical electric field intensity is offset slightly from the "knot" portion toward the "trunk" portion. Therefore, the conductive buffer layer is made as thin as possible so that the amount of increase in the insertion loss is reduced; thus, the tunable range can be expanded.

Here, in the present embodiment, as shown in FIG. 11G, nine tunable bandpass filter chips 301A are cut out from the single cavity-type tunable bandpass filter 301. However, the size of the substrate is not intended to be limited to this size. For example, a batch film-forming process may be carried out on a large substrate having a size of not less than φ50 mm, and several hundreds of tunable bandpass filter chips may be manufactured at one time.

Moreover, in the second embodiment, Ag (silver) is used as the conductive buffer layer; however, in place of this, Ru (ruthenium) may be deposited with a thickness of 1 nm, and in place of the PLZT thin film, $Sr_xBa_{1-x}TiO_3$ (X=0.3) may be formed as the spacer layer. In this case, in association with the Ru oriented film with orientation (002), the SBT film with orientation (110) is formed so that the primary electrooptic effect is exerted in the vicinity of room temperature; thus, a tunable bandpass filter having a memory effect can be achieved.

(Third Embodiment)

Figure 19:
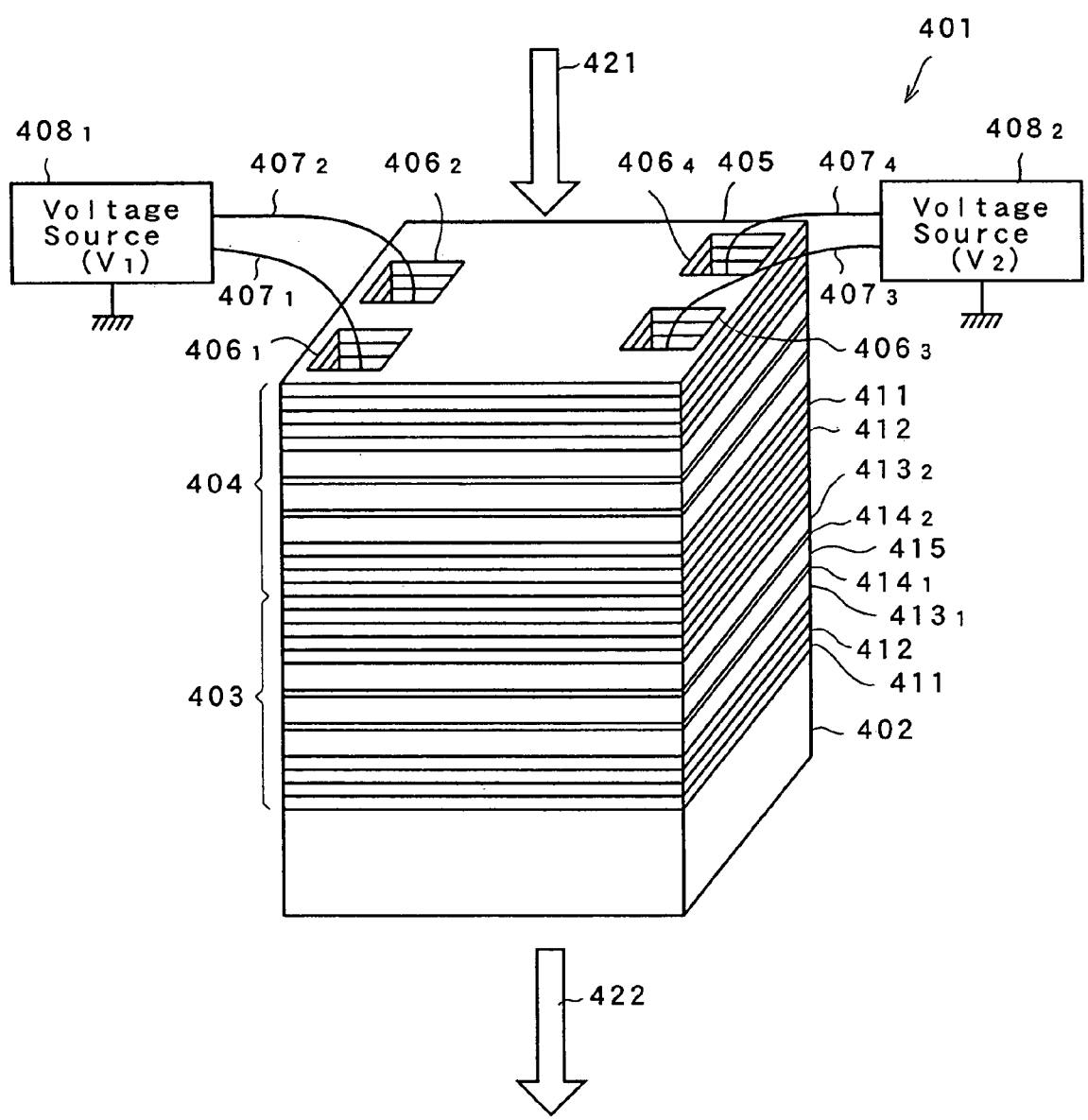
FIG. 19 is a perspective view of a double cavity-type tunable bandpass filter in accordance with a third embodiment of the present invention.

FIG. 19 shows an appearance of a double cavity-type tunable bandpass filter in accordance with the third embodiment of the present invention. This double cavity-type tunable bandpass filter 401 has a structure in that a first cavity 403 is formed on a glass substrate 402 made of MgO single crystal having a refractive index of 1.72 and a second cavity 404 is formed thereon. A coupling layer 405 is placed as the uppermost layer of the second cavity 404. First to fourth holes $406_1$ to $406_4$, each having a depth reaching an electrode (not shown) on respective layer, are formed in the surface of the coupling layer 405. One end of each of wires $407_1$ and $407_2$ for the first cavity is inserted to each of the first and second holes $406_1$ and $406_2$, and bonded to an electrode, not shown. The other end of each of the wires $407_1$ and $407_2$ for the first cavity is connected to a first voltage source $408_1$ for the first cavity 403. Moreover, one end of each of wires $407_3$ and $407_4$ for the second cavity is inserted to each of the third and fourth holes $406_3$ and $406_4$, and bonded to an electrode, not shown. The other end of each of the wires $407_3$ and $407_4$ for the second cavity is connected to a second voltage source $408_2$ for the second cavity 404.

In this double cavity-type tunable bandpass filter 401, incident light rays 421 are made incident on the second cavity 404 on the coupling layer 405 side, and the first and second voltage sources $408_1$ and $408_2$ are properly driven so that a light ray having an optional wavelength is released as a transmitted light ray 422. The design wavelength $\lambda_0$ of the bandpass filter 401 of the present embodiment is set to 1550 nm.

In the tunable bandpass filter 401, the first cavity 403 and the second cavity 404 have the same structure except that the structure of the coupling layer 405 is slightly different. Therefore, the structure of the first cavity 403 is mainly explained, and the explanation of the second cavity 404 is omitted on demand.

Figure 20:
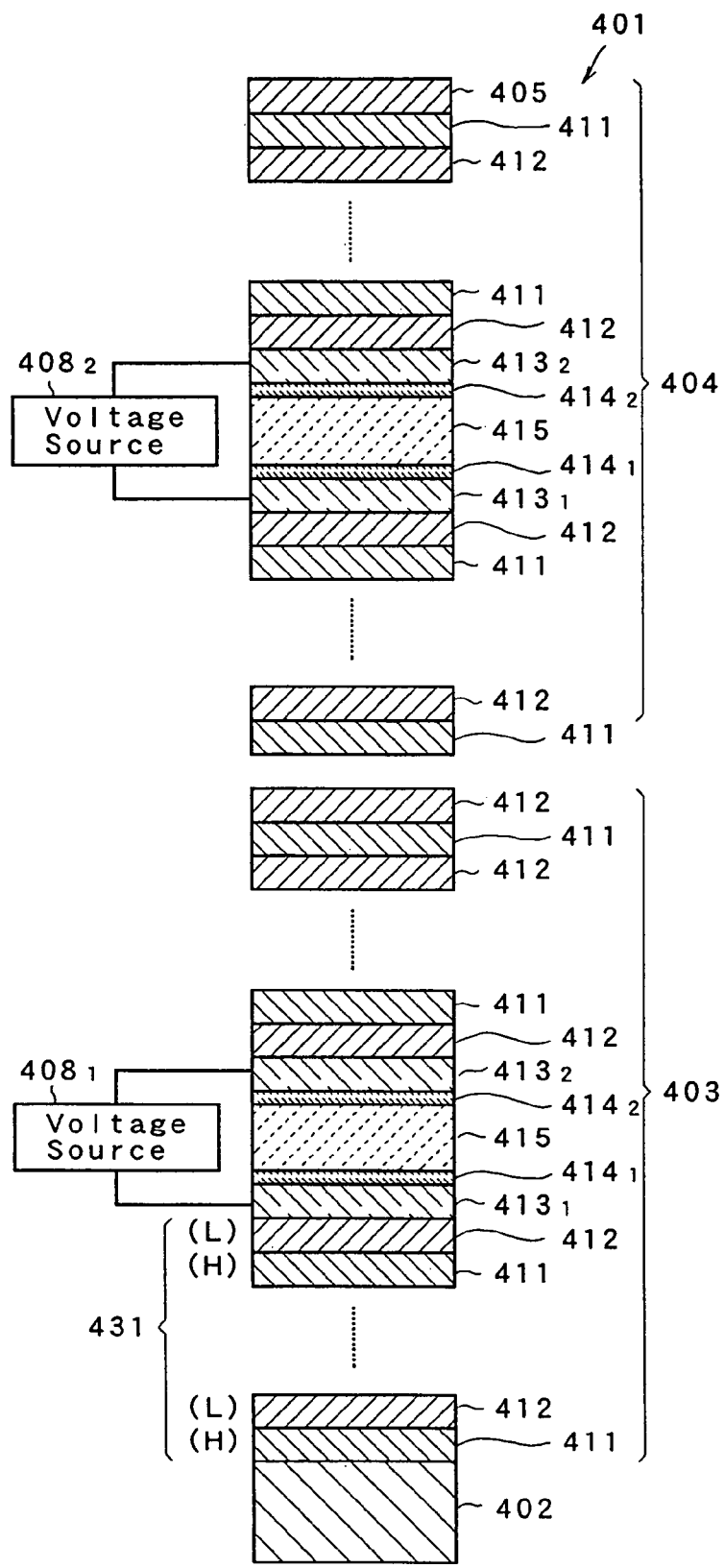
FIG. 20 is an explanatory diagram that shows the structure of the double cavity-type tunable bandpass filter in accordance with the third embodiment.

FIG. 20 shows the structure of the double cavity-type tunable bandpass filter shown in FIG. 19. The first cavity 403 has a structure in that dielectric thin films made of $Ta_2O_5$ (refractive index $n_H$=2.13) serving as high refractive index dielectric thin films (H) 411 and $SiO_2$ films (refractive index $n_L$=1.48) serving as low refractive index dielectric thin films (L) 412 are alternately stacked on a substrate 402 made of MgO single crystal. ZnO films are used as transparent conductive films $413_1$ and $413_2$. The refractive index $n_C$ thereof is 1.94. The transparent conductive films $413_1$ and $413_2$ function as transparent conductive films in the vicinity of the wavelength 1550 nm, and provide resistivity of 3 Ωcm. Pt films are used as conductive buffer layers $414_1$ and $414_2$. The resistivity of the Pt films is $1.1 \times 10^{-5}$ Ωcm. Here, an $Sr_xBa_{1-x}TiO_3$ (where X=0.9) (hereinafter, referred to as SBT) film having the secondary electrooptic effect is used as the spacer layer 415. The refractive index ($n_M$) is 2.3. The lattice constants of the Pt films and SBT films are respectively 3.924 angstroms and 3.91 angstroms, and the lattice mismatching rate M is 0.36%; thus, these films satisfy conditions for forming a superior epitaxial film.

Air having a refractive index of 1.0 is used as the external medium. The film of this double cavity-type tunable bandpass filter 401 is represented by the following expression structure (24):

$$B = [(HL)^7(CE)10M(EC)(LH)^7L]^2 \quad (24).$$

Here, the film thickness of the conductive buffer layer (E) is set to 4 nm.

The manufacturing method for the double cavity-type tunable bandpass filter 401 of the third embodiment is the same as the tunable bandpass filter 301 of the second embodiment. Therefore, the manufacturing method is explained by replacing those numerical numbers shown in FIG. 11 with those numerical numbers shown in FIG. 20 on demand.

First, a substrate 402 made of MgO single crystal of $10 \times 10 \times t_2$ mm$^3$ having a clean surface is prepared as shown in the first process in FIG. 11. Next, as shown in the second process in FIG. 11, a film-forming temperature is set at 650° C. in a vacuum chamber that has been sufficiently vacuumed. Then by using an ion-assist vapor deposition method, $Ta_2O_5$ films serving as high refractive index dielectric thin films (H) 411 and $SiO_2$ films serving as low refractive index dielectric thin films (L) 412 are alternately stacked on (100) face of the MgO single crystal substrate. Thus, first mirror stack layers 431 (HL)$^7$ are stacked. The physical film thicknesses of the ¼-wavelength of the H layer and the L layer are as follows:

$d_H$=181 nm $d_L$=261 nm.

Successively, as shown in the third process, a ZnO film (C) that forms a first transparent conductive film $413_1$ is vapor-deposited on the first mirror stack layer 431 with a thickness of 199 nm. Since the ZnO film is an intrinsic semiconductor in which conductivity is generated by the oxygen deficit, the oxygen gas flow rate is adjusted so that the film is formed with the resistivity being set at 3 Ωcm. Thus, the film functions as a superior transparent conductive film having an attenuation coefficient of not more than $10^{-4}$. Then, in the same manner, a Pt film is stacked on the upper surface as a conductive buffer layer $414_1$ with a thickness of 4 nm. An SBT film is stacked thereon as a spacer layer 415 that has the secondary electrooptic effect with a thickness of 10 M (1.68 μm). Thereafter, in the same manner, a Pt film is stacked on the upper surface as a conductive buffer layer $414_2$ with a thickness of 4 nm, and a ZnO film that forms a transparent conductive film $413_2$ is vapor-deposited thereon with a thickness of 199 nm. Successively, second mirror stack layer 432 "(HL)$^7$" are stacked. Lastly, couping layer L is vapor-deposited thereon in the same manner, with a physical film thicknesses of a ¼-wavelength of 261 nm. By repeating the above-mentioned processes, a double cavity-type bandpass filter is formed.

When the spacer layer 415 was evaluated by using the θ-2θX ray diffraction pattern, a single surface index (002) in a single phase was confirmed, and this was confirmed to be an epitaxial thin film. Moreover, in the structure of the present embodiment, the coefficient of thermal expansion of the MgO substrate 402 serving as the substrate material is set to $+14 \times 10^{-7}$/° C. so that the multilayer film portion is well-balanced with the effective thermal stress; thus, it becomes possible to form a flat film without cracks over the film-forming substrate.

Next, the sequence proceeds to the electrode-forming process in the same manner as the second embodiment. Different from the second embodiment, the third embodiment has the double cavity structure. Therefore, as shown in FIG. 19, total four electrodes are formed on one tunable bandpass filter chip that has been cut. These four electrodes (not shown) are respectively formed on the first cavity 403, the first transparent conductive film $413_1$ and the second transparent conductive film $413_2$ of the second cavity 404. The external first voltage source $408_1$ is connected to the first cavity 403 and the second voltage source $408_2$ is connected to the second cavity 404 so that these are driven independently.

Also in the present embodiment, the size of the substrate 402 to be used in the present embodiment is not particularly limited; for example, a batch film-forming process may be carried out on a large substrate having a size of not less than ϕ50 mm, and several hundreds of tunable bandpass filter chips may be manufactured. Moreover, in an attempt to achieve a higher response speed, it is possible to miniaturize the area of the tunable bandpass filter chip from 2.5×2.5 mm$^2$ to, for example, 0.5×0.5 mm$^2$, or smaller; thus, it becomes possible to reduce the electrostatic capacitance, and also to achieve a higher response speed of not more than 3 ns.

(Fourth Embodiment)

Figure 21:
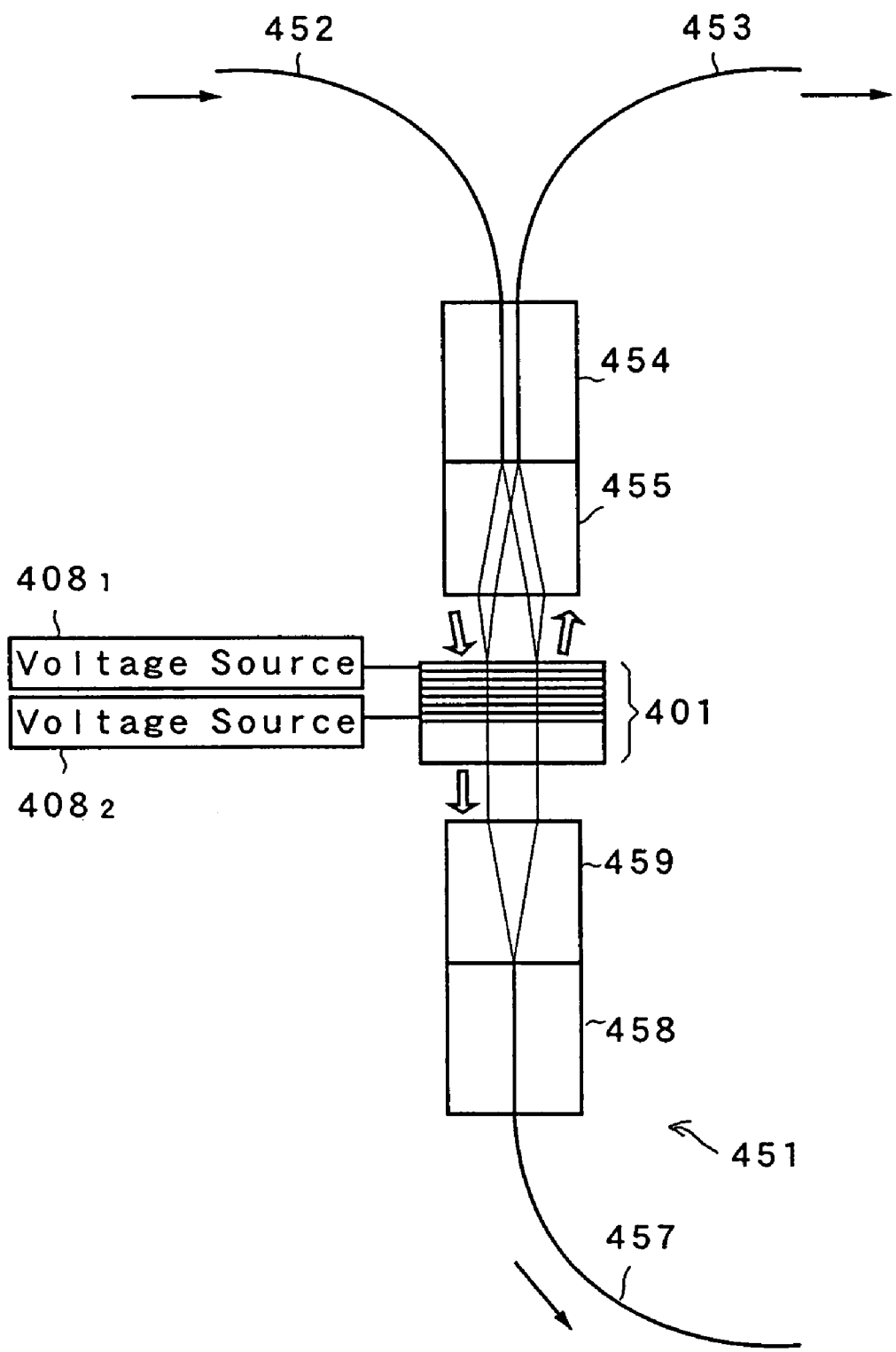
FIG. 21 is a schematic structural diagram that shows an optical drop module in accordance with a fourth embodiment.

FIG. 21 shows an optical drop module in accordance with a fourth embodiment, which uses the double cavity-type tunable bandpass filter of the third embodiment. The optical drop module 451 is provided with an incident-side optical fiber 452 that propagate a plurality of incident light signal components ($\lambda_1, \lambda_2, \ldots, \lambda_n$), a reflection-side optical fiber 453 that reflects one portion of a light signal that is made incident from the incident-side optical fiber 452, a biaxial capillary 454 that holds the ends of these two optical fibers 452 and 453, a first GRIN (GRaded-INdex) lens 455 that forms light rays placed between the end of the biaxial capillary 454 and the input side of the tunable bandpass filter 401 into parallel light rays, a transmission-side optical fiber 457 that transmits one portion of a light signal that has been made incident from the optical fiber 452, a monoaxial capillary 458 that holds the transmission-side optical fiber 457, and a second GRIN lens 459 that is placed between the monoaxial capillary 458 and the transmission side of the tunable bandpass filter 401.

In this optical add-drop module 451, a plurality of incident light signal components ($\lambda_1, \lambda_2, \ldots, \lambda_n$) transferred inside the incident-side optical fiber 452, are made incident on the double cavity-type tunable bandpass filter 401 as spatial parallel beams through the first GRIN lens 455. As shown in FIG. 19, first and second voltage sources $408_1$ and $408_2$, which serve as wavelength selection units, are connected to the tunable bandpass filter 401 in association with the respective cavities 403 and 404. By controlling voltages in these power sources to the same value, a desired wavelength $\lambda_i$ can be selected within the tunable range. The transmitted wavelength component $\lambda_i$ thus dropped is coupled to the transmission-side optical fiber 457 through the second GRIN lens 459 so that it is transmitted to a light signal network, not shown, that is a system separated from the incident-side optical fiber 452. The other wavelength components are reflected by the tunable bandpass filter 401 as reflected light signals, and coupled to the reflection-side optical fiber 453.

Figure 22:
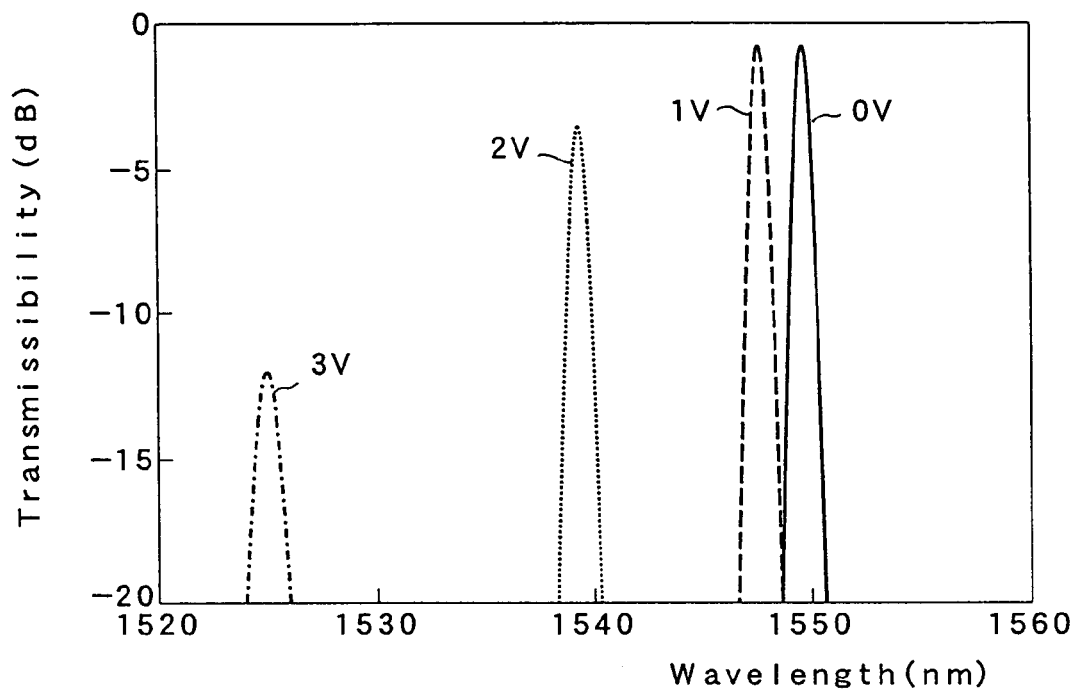
FIG. 22 is a performance mapping that shows a state where the wavelength of transmitted light changes, in accordance with the fourth embodiment.

FIG. 22 shows a state where the wavelength of the transmitted light is changed in the optical drop module 451. When the same voltage is commonly outputted from the first and second voltage sources $408_1$ and $408_2$ of FIG. 19 and applied to the above-mentioned electrodes of the tunable bandpass filter 401, the transmitted wavelength of a light signal outputted from the transmission-side optical fiber 457 is changed by the applied voltage as shown in FIG. 22. Moreover, in the case of a tunable width 10 nm, the insertion loss in the transmitted wavelength is not more than 5 dB, which shows a superior characteristic in the loss.

In the case of the applied voltage of 2 V, the amount of wavelength shift was −11 nm. This corresponds the fact that the amount of change $\Delta n$ in the refractive index is −0.0073. Based upon this characteristic, by using the above-mentioned equation (3), the second-order electrooptical coefficient $R_{13}$ ($=R_{23}$) forms $3.4 \times 10^{-15}$ m$^2$/V$^2$. This value corresponds to almost the same coefficient which is reported with respect to the single crystal substrate. With respect to the driving voltage, since the spacer layer 415 is thin, a driving operation is available at a very low driving voltage of 3 V.

Moreover, the response speed of the sample of the present embodiment is limited by the RC time constant that is defined by the resistance value (R) of the composite conductive layer and the capacitance (C) of the SBT paraelectric material that forms the spacer layer. The response speed of the present embodiment, obtained from the equation (19), was 39 ns. Therefore, it is not necessary to use an expensive high-voltage amplifier capable of high-speed response. Moreover, the filter of the present embodiment is directly driven by using a high-speed IC chip in the 3.3 V standard derived from a personal computer or an electronic apparatus, thereby making it possible to provide an inexpensive, small-size tunable bandpass filter and an optical drop module 451. Consequently, the fourth embodiment makes it possible to realize an inexpensive tunable bandpass filter that has high reliability with a sharp filter characteristic and is operated within a tunable range of about 11 nm without using any mechanical driving parts, and the optical drop module 451 using such a filter.

(Fifth Embodiment)

Figure 23:
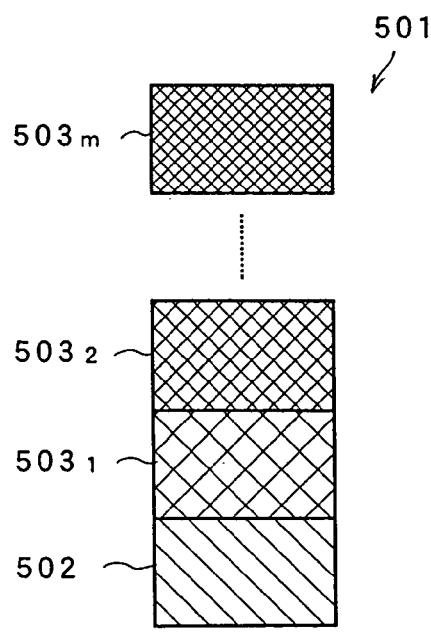
FIG. 23 is an explanatory diagram that shows a structure of an m-multiplex cavity-type tunable bandpass filter in accordance with a fifth embodiment.

FIG. 23 shows a structure of an m-multiplex cavity-type tunable bandpass filter in accordance with a fifth embodiment. Here, the driving power source is not shown in the figure. The m-multiplex cavity-type tunable bandpass filter 501 (where the numeric value m is a positive integer) has a structure in that cavities from the first cavity $503_1$ to the m-th cavity $503_m$ are successively superposed on a substrate 502 in an m-folded state. In this manner, as the cavities are superposed in the two stages, the three stages and so on, it becomes possible to make the wavelength selection characteristic of the m-multiplex cavity-type tunable bandpass filter 501 sharper.

The following description will discuss the fifth embodiment by exemplifying a case of triple cavities. Here, the design wavelength $\lambda_0$ of the m-multiplex cavity-type tunable bandpass filter 501 is set to 1550 nm. Dielectric thin films made of Nb$_2$O$_5$ (refractive index $n_H$=2.22) serving as high refractive index thin films (H) and SiO$_2$ film (refractive index $n_L$=1.48) serving as low refractive index thin films (L) are alternately formed on a WMS-15 glass substrate (made by Ohara Inc., refractive index: 1.51). Moreover, a CdSnO$_4$ (hereinafter, referred to as CTO) film is used as the transparent conductive film. The refractive index $n_C$ is 1.9. The transparent conductive film functions as a transparent conductive film in the vicinity of the wavelength 1550 nm, and provide resistivity of $4.4 \times 10^{-3}$ Ωcm. SrRuO$_3$ (hereinafter, referred to as SRO) films are used for conductive buffer layers. The resistivity of the SRO films is set to $1.1 \times 10^{-4}$ Ωcm.

Here, an Sr$_X$Ba$_{1-X}$TiO$_3$ (where X=0.9) (SBT) thin film having the secondary electrooptic effect is used as the spacer layer. The refractive index ($n_M$) is 2.3. Air having a refractive index of 1.0 is the external medium. The resulting film is represented by the following expression structure (25):

$$B=[(HL)^7(CE)10M\ (EC)(LH)^7L]^3 \quad (25).$$

Here, the film thickness of the conductive buffer layer (E) is set to 8 nm.

The manufacturing method for the triple cavity-type tunable bandpass filter 501 of the fifth embodiment is the same as that of the aforementioned second or third embodiment. Therefore, referring to FIG. 11 on demand, the manufacturing method is explained. First, a glass substrate having a clean surface is prepared as shown in the first process in FIG. 11. Next, as shown in the second process in FIG. 11, a film-forming temperature is set at 600° C. in a vacuum chamber that has been sufficiently vacuumed. Then by using an ion-beam sputtering method, Nb$_2$O$_5$ films serving as high refractive index thin films (H) and SiO$_2$ films serving as low refractive index thin films (L) are alternately stacked on a WMS-15 glass substrate of 10×10×t$_2$ mm$^3$; thus a first mirror stack layer "(HL)$^7$" is stacked. The physical film thicknesses of the ¼-wavelength of the respective layers are as follows:

$d_H$=175 nm $d_L$=262 nm

Successively, as shown in the third process, a CTO film that forms a transparent conductive film is vapor-deposited on the first mirror stack layer with a thickness of 194 nm. Since the CTO film is an intrinsic semiconductor in which conductivity is generated by the oxygen deficit, the oxygen gas flow rate is adjusted so that the film is formed with the resistivity being set at $4.4 \times 10^{-3}$ Ωcm. Thus, the film is allowed to function as a superior transparent conductive film having an attenuation coefficient of not more than $1 \times 10^{-4}$. Then, in the same manner, an SRO film is stacked thereon as a conductive buffer layer with a thickness of 8 nm. Successively, an SBT film is stacked thereon with a thickness of 10 M (1.68 μm). Thereafter, in the same manner, an SrRuO$_3$ film is stacked on the upper surface with a thickness of 8 nm, and a CTO film that forms an upper-surface transparent conductive film is vapor-deposited thereon with a thickness of 1 C. Successively, second mirror stack layer "(LH)$^7$" is stacked. Lastly, a coupling layer L is vapor-deposited thereon in the same manner, with a physical film thickness of the ¼-wavelength of 262 nm. By repeating the above-mentioned processes, a triple cavity-type bandpass filter 501 is formed.

When the spacer layers thus formed were evaluated by using the θ-2θX ray diffraction pattern, a single surface index (002) in a single phase was confirmed, and this was confirmed to be an epitaxial thin film.

The triple cavity-type tunable bandpass filter 501 of the fifth embodiment is similar to the double cavity-type tunable bandpass filter 401 of the third embodiment; however, it is constituted by three cavities. Therefore, three independent external driving sources are required. Moreover, total six electrodes for each cavity to be driven by these three voltage sources are required. Incident light rays are externally made incident thereon, and only the light ray component corresponding to the center wavelength of the filter is transmitted.

In the electrode-forming processes of the tunable bandpass filter 501, total six electrodes are formed on one tunable bandpass filter chip that has been cut based upon the triple cavity structure. The six electrodes are respectively formed on the upper and lower faces of the transparent conductive thin film of each of the spacer layers of the first, second and third cavities.

Figure 24:
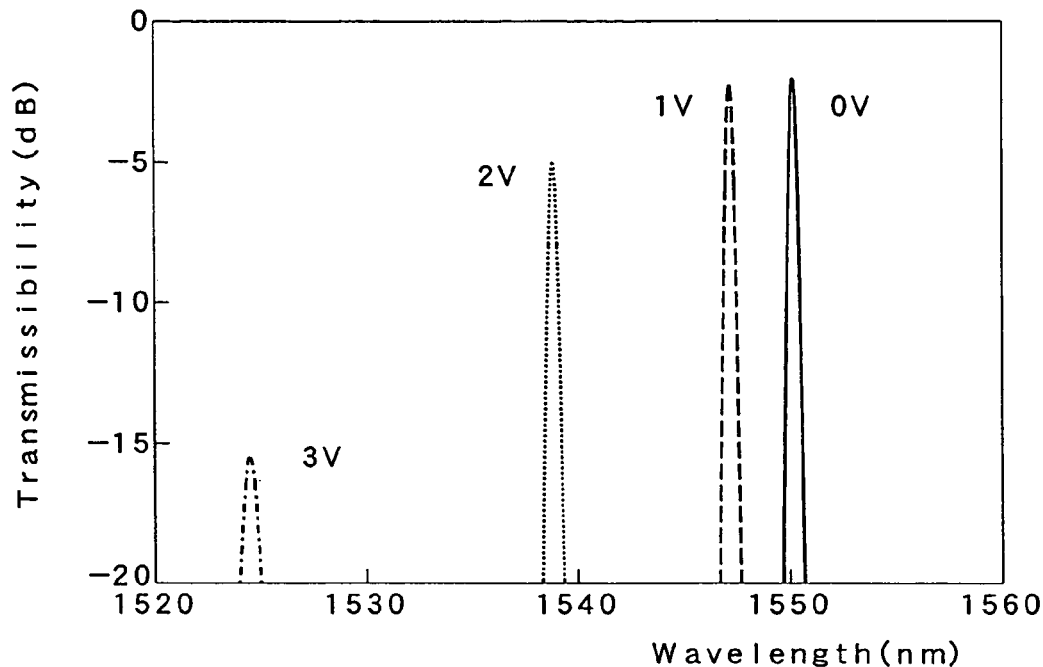
FIG. 24 is a performance mapping that shows a tunable characteristic of a triple cavity-type tunable bandpass filter in accordance with the fifth embodiment.

FIG. 24 shows a tunable property of the triple cavity-type tunable bandpass filter of the fifth embodiment. Randomly polarized light rays are externally made incident perpendicularly on the triple cavity-type tunable bandpass filter 501 of the present embodiment, with a DC current voltage being applied in the thickness direction. As indicated by this figure, it is found that the transmission spectral characteristic of the bandpass filter is changed. The insertion loss in the transmitted wavelength is about 5 dB. In the case of the applied voltage of 2 V, the amount of wavelength shift is −11 nm. This indicates the fact that the amount of change Δn in the refractive index is −0.0073.

Based upon this characteristic, by using the above-mentioned equation (3), the second-order electrooptical coefficient $R_{13}$ (=$R_{23}$) forms $3.4 \times 10^{-15}$ m$^2$/V$^2$. This value corresponds to almost the same coefficient which has been reported with respect to the single crystal substrate. With respect to the driving voltage, since the SBT thin film is thin, a driving operation is available at a very low driving voltage of 3 V. Moreover, the response speed of the present embodiment is limited by the RC time constant that is defined by the resistance value (R) of the composite conductive layer and the capacitance (C) of the SBT paraelectric material that forms the spacer layer. The response speed of the present embodiment, obtained from the equation (19), was 350 ns. Therefore, it is not necessary to use an expensive high-voltage amplifier capable of high-speed response. Moreover, the filter of the present embodiment is directly driven by using a high-speed IC chip in the 3.3 V standard derived from a personal computer or an electronic apparatus, thereby making it possible to provide an inexpensive, small-size tunable bandpass filter and an optical drop module. Consequently, the fifth embodiment makes it possible to realize an inexpensive tunable bandpass filter that has high reliability with a sharp filter characteristic and is operated within a wide tunable range of about 11 nm without using any mechanical driving parts.

Here, in place of SBT used in the present embodiment, {KTa$_x$Nb$_{1-x}$O$_3$ (where 0≦X≦1.0)}, which has the same perovskite-type crystal structure, may be used so that an electrooptic coefficient ($3.9 \times 10^{-15}$ m$^2$/V$^2$), which is the same level of coefficient, is obtained. Its lattice constant is 3.99 angstroms, which is close to that of SrRuO$_3$. Moreover, in place of the CTO film, ZnSnO$_3$, which has the perovskite-type crystal structure, may be used to obtain the same characteristics. ZnSnO$_3$ has a feature in that it is composed of non-toxic substances.

Moreover, the size of the substrate is not particularly limited; and for example, a batch film-forming process may be carried out on a large substrate having a diameter of not less than 50 mm, and several hundreds of tunable bandpass filter chips may be manufactured.

(Sixth Embodiment)

Figure 25:
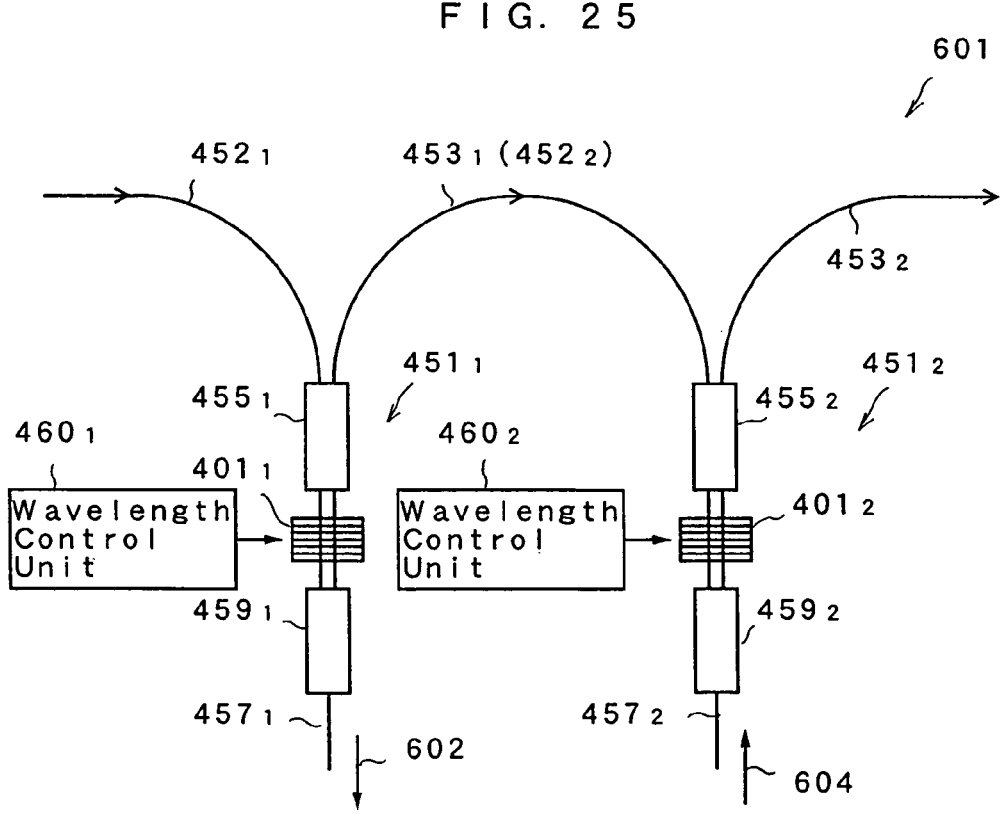
FIG. 25 is a schematic structural diagram that shows an optical add-drop module in accordance with a sixth embodiment of the present invention.

FIG. 25 schematically shows a structure of a hitless optical add-drop module in accordance with a sixth embodiment of the present invention. The hitless optical add-drop module 601 of the present embodiment has a structure in that two optical drop modules 451 of the third embodiment shown in FIG. 21 are used; and with respect to its tunable bandpass filter, the triple cavity-type tunable bandpass filter of the fifth embodiment is used. Therefore, with respect to the first optical drop module 451$_1$, the reference numeral of each of parts used in FIG. 21 is added by a subscript "1", and with respect to the second optical drop module 451$_2$, the reference numeral of each of parts is added by a subscript "2". Moreover, the biaxial capillary 454 and monoaxial capillary 458 shown in FIG. 21 are not shown in the figure.

The optical add-drop module 601 has an arrangement in that a plurality of incident light signal components (λ$_1$, λ$_2$, . . . , λ$_n$), sent from other nodes, not shown, are made incident on the incident-side optical fiber 452$_1$ of the first optical drop module 451$_1$, and an optical signal having a wavelength λ$_i$ passed through the tunable bandpass filter 401$_1$ is taken out as a drop signal 602 from the transmission-side optical fiber 457$_1$. Moreover, the light signals having the rest of wavelengths that have not been taken out as the drop signal 602 are transferred to an incident-side optical fiber 452$_2$ of the second optical drop module 451$_2$ from the reflection-side optical fiber 453$_1$.

In the second optical drop module 451$_2$, light signals having the rest of wavelengths except for the light signal having the wavelength λ$_i$ are made incident on the first GRIN lens 455$_2$ so that these are totally reflected by the incident face of the triple cavity-type tunable bandpass filter 401$_2$. In contrast, an add signal 604 having the same wavelength $\lambda_i$ as the dropped wavelength $\lambda_i$ is made incident on the second GRIN lens $459_2$ through an optical fiber $457_2$, and this is allowed to pass through the triple cavity-type tunable bandpass filter $401_2$, and coupled to the reflection-side optical fiber $453_2$. Consequently, the reflection-side optical fiber $453_2$ is allowed to send incident light signal components $(\lambda_1, \lambda_2, \ldots, \lambda_n)$ to the next nodes, not shown, with light signals having the wavelength $\lambda_i$ being switched.

In the optical add-drop module 601 shown in FIG. 25, the voltage sources for the first and second optical drop modules $451_1$ and $451_2$ are collectively shown as wavelength control units $460_1$ and $460_2$ respectively. Thus, by desirably selecting the output voltages thereof, the wavelength $\lambda_i$ to be added and dropped is freely switched.

Figure 26A:
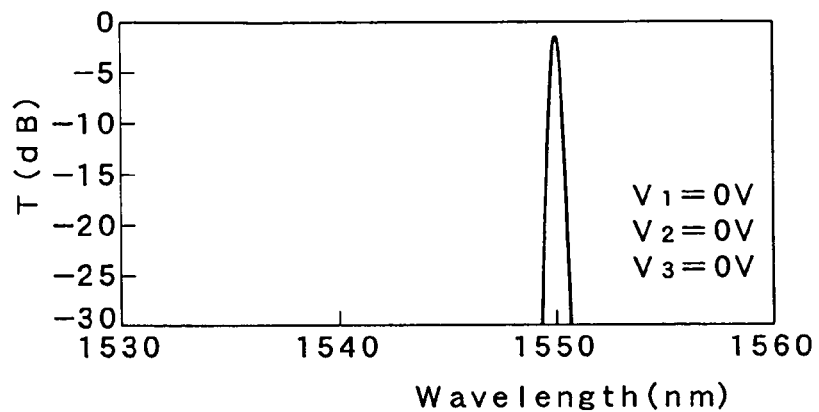
FIGS. 26A to 26C are performance mappings that show a state where a switching operation of wavelengths is carried out by using the optical add-drop module in accordance with the sixth embodiment.

FIG. 26 shows one example of a switching process of wavelengths using this optical add-drop module. Here, output voltages (applied voltages) of the driving power sources to be applied to the first to third cavities of the respective bandpass filters $401_1$ and $401_2$ are given as $V_1$ to $V_3$. FIG. 26A shows the transmissibility in the case where these output voltages $V_1$ to $V_3$ are commonly set to 0 V. In this case, the three cavities have resonance wavelengths at the same wavelength, that is, 1550 nm.

Figure 26B:
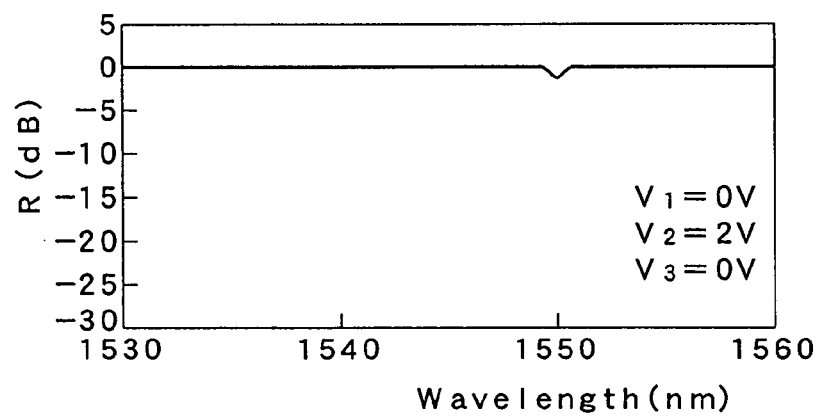

FIG. 26B shows the reflectance when both of the output voltages $V_1$ and $V_3$ are 0 V with the output voltage $V_2$ being set to 2 V. In this case, the first and third cavities and the second cavity have respective resonance wavelengths at 1550 nm and 1539 nm. In this case, the optical add-drop module 601 of the present embodiment almost has a high reflection characteristic within the tunable range, with the result that it has only the function as a mirror to cause no reduction in the signal strength in a specific wavelength channel.

Figure 26C:
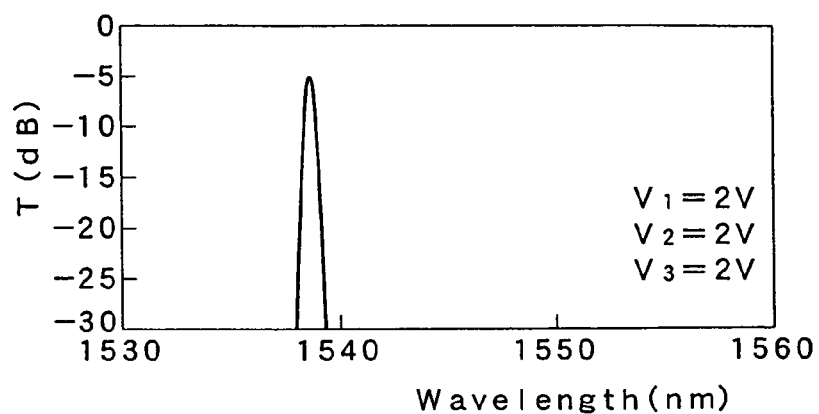

FIG. 26C shows the transmissibility when the output voltages $V_1$ to $V_3$ are commonly set to 2 V. In this case, the three cavities have resonance wavelengths at the same wavelength, that is, 1539 nm, and exhibit a transmission filter characteristic that is less susceptible to transmission loss.

In conventional tunable bandpass filters, upon shifting the wavelength from one wavelength $\lambda_i$ to another wavelength $\lambda_j$, the wavelength is changed by crossing a wavelength range located in between. Therefore, upon carrying out wavelength multiplex optical communication, it causes a fault to the multichannel. In contrast, in the present embodiment, upon shifting the wavelength from one wavelength $\lambda_i$ to another wavelength $\lambda_j$, the respective resonance frequencies of the multiplex cavities are once offset, and the voltage is then controlled so that the same resonance wavelength, that is, the wavelength $\lambda_j$, is obtained. This arrangement makes it possible to avoid crossing another wavelength range in the course of the wavelength shift, and consequently to stop causing adverse effects to optical signals having wavelengths located in the course. This function is referred to as a hitless function. Moreover, the optical add-drop module 601 has a high-speed response characteristic of 350 ns, can be operated at a low voltage, has a small size with high reliability without the necessity of mechanically movable parts, and is capable of specifying a desired signal channel so that the corresponding wavelength component is added or dropped.

Here, the wavelength controlling units $460_1$ and $460_2$ are used for changing the transmission peak wavelength of the bandpass filter. In order to realize hitless operations, the wavelength controlling units carry out controls so that switching operations are made among a state where all the voltages are set to a first voltage with the selected wavelength being set as the first wavelength, a state where any of the voltages are set to a second voltage, and a state where all the voltage are set to the second voltage with the selected wavelength being set as the second wavelength.

Here, the hitless optical add-drop module 601 of the present embodiment can be realized by using an optical bandpass filter having a multiplex resonator having double cavities or more. By offsetting at least one or more resonance wavelengths of the respective cavities in an m-multiplex resonator, switching can be made to a high reflection mirror state as shown in the present embodiment. In the case of the fourth embodiment also, a hitless drop process is achieved by controlling the voltage.

(Seventh Embodiment)

Figure 27:
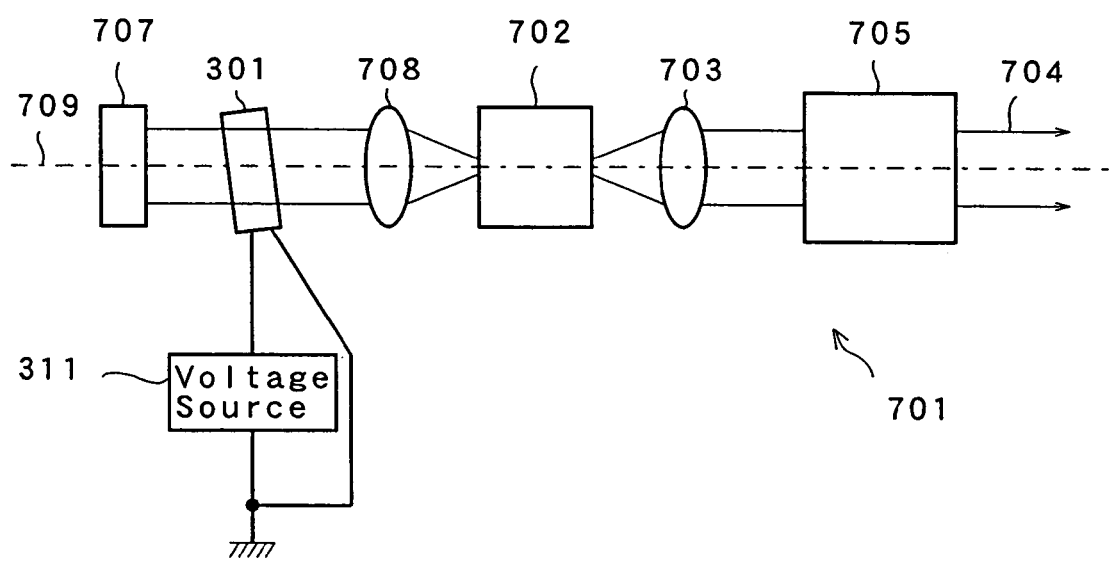
FIG. 27 is a schematic structural diagram that shows a tunable light source in accordance with a seventh embodiment of the present invention.

FIG. 27 schematically shows a structure of a tunable light source in accordance with the seventh embodiment of the present invention. A tunable light source 701 in accordance with the present embodiment is provided with a semiconductor laser element 702 serving as a light source. An output lens 703, which collimates a laser beam, is placed on an end face to which an output-coupling coat (OC) is applied, on the output side of the semiconductor laser element 702. Moreover, an optical isolator 705 that directs an outputted laser light beam to a predetermined course as an output beam 704, and is used for blocking return light, is placed on the light axis of this output lens 703.

In a manner so as to oppose this, a reflection mirror 707 is placed on an end face to which an anti-reflection coat (AR) is applied of the semiconductor laser element 702. Between these, an inner lens 708 and the single cavity-type tunable bandpass filter 301, explained in the second embodiment, are placed. The inner lens 708 collimates a laser light beam outputted from the semiconductor laser element 702. The tunable bandpass filter 301 is used as a wavelength selecting device. As shown in FIG. 10, the tunable bandpass filter 301 is connected to the voltage source 311 one end of which is connected to ground, as shown in FIG. 10.

Here, the tunable bandpass filter 301 is slightly inclined with respect to the light axis 709 of the inner lens 708 so as to form an incident angles 20. In the present embodiment, the semiconductor laser element 702 is used as a gaining medium. The reflectance of the anti-reflection coating (AR) is set to 0.1% in the vicinity of a wavelength of 1550 nm, and the reflectance of the output-coupling coating (OC) is set to 30% in the same wavelength. A laser resonator is constituted by the output-coupling coating unit and the reflection mirror 707 of the semiconductor laser element 702. The outgoing beam of the semiconductor laser is converted into parallel beams by the inner lens 708, and allowed to propagate to the reflection mirror 707. At this time, the single cavity-type tunable bandpass filter 301 transmits only the laser light beam having an optional wavelength, and the resulting laser beam is reflected by the reflection mirror 707. The laser resonator length is only 10 mm.

In this manner, the tunable light source 701 of the present embodiment provides the output beam 704 having a wavelength corresponding to the transmitted light from the single cavity-type tunable bandpass filter 301. When the applied voltage to the single cavity-type tunable bandpass filter 301 from the driving power source 311 is increased from 0 V to 20 V, the laser operation wavelength is allowed to vary in a range from 1550 nm to 1523 nm. In this manner, a tunable width of 27 nm is confirmed. Moreover, the response characteristic of the wavelength change in relation to the change in the output voltage from the voltage source 311 is superior so that a high-speed response time of 84 ns is obtained in the same manner as the second embodiment.

In the above-mentioned present embodiment, the tunable bandpass filter 301 in accordance with the second embodiment, as shown in FIG. 10, is adopted. Thus, it is possible to achieve a tunable light source 701 that is 100 times or more faster than the conventional tunable power source of this type, and has a tunable speed of not more than 10 nm per 100 ns. It is also possible to achieve a tunable power source even when a tunable bandpass filter in accordance with each of the other embodiments is used.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An optical element comprising at least one cavity which includes:
    a first composite stack layer having a first mirror stack layer formed by alternately stacking a plurality of first and second dielectric thin films having respectively different refractive indexes and a first conductive film formed on the first mirror stack layer;
    a second composite stack layer having a second mirror stack layer formed by alternately stacking a plurality of first and second dielectric thin films having respectively different refractive indexes and a second conductive film formed on the second mirror stack layer;
    a spacer layer placed between said first and second composite stack layers and made of a plane dielectric member having at least either primary or secondary electrooptic effect; and
    a conductive buffer layer formed between at least one of said first composite stack layer and said second composite stack layer and said spacer layer;
    wherein said first mirror stack layer is formed by stacking a first dielectric thin film which is made of a high refractive index material and has a physical film thickness of a ¼-wavelength of a design wavelength and a second dielectric thin film which is made of a low refractive index material having a refractive index lower than the high refractive index material and has a physical film thickness of the ¼-wavelength, alternately at least one time,
    said second mirror stack layer is formed by stacking a first dielectric thin film which is made of the high refractive index material and has the physical film thickness of the ¼-wavelength and a second dielectric thin film which is made of the low refractive index material having the refractive index lower than the high refractive index material and has the physical film thickness of the ¼-wavelength, alternately at least one time,
    said spacer layer is placed between said first and second mirror stack layers and is made of a dielectric thin film having a film thickness of positive even-number times the physical film thickness of the ¼-wavelength and having a primary or secondary electrooptic effect,
    said first conductive film is made of a conductive thin film which has a film thickness of positive odd-number times the physical film thickness of the ¼-wavelength, and
    said second conductive film is made of a transparent conductive thin film which has a film thickness of positive odd-number times the physical film thickness of the ¼-wavelength.

2. An optical element according to claim 1, wherein a plurality of said cavities are stacked in a form of a layer.

3. An optical element according to claim 1, wherein each of said cavities includes a characteristic controlling unit which controls spectrum characteristics of light rays made incident on said first and second composite stack layers and transmitted through or reflected from the layer, in response to a voltage applied between said first and second conductive films.

4. An optical element according to claim 1, wherein said conductive buffer layer is made of at least one material selected from a metal material, an oxide material, a nitride material and an alloy material, and has resistivity of at most $10^{-2}$ Ωcm, with a thickness set in a range from 0.1 nm to 10 nm.

5. An optical element according to claim 1, wherein said spacer layer is a thin film formed through vapor deposition and made of an oxide dielectric material that exhibits at least one of primary and secondary electrooptic effects, and has at least one film structure selected from a polycrystal film, an oriented film and an epitaxial film, with a thickness in a range from 10 nm to 50 μm.

6. An optical element according to claim 5, wherein said oxide dielectric material is $Pb_{1-x}La_x(Zr_{1-y}Ti_y)_{1-x/4}O_3$, ($0 \leq X < 1.0$, $0 \leq Y \leq 1.0$).

7. An optical element according to claim 5, wherein said oxide dielectric material is $Sr_xBa_{1-x}TiO_3$, ($0 \leq X \leq 1.0$).

8. An optical element according to claim 5, wherein said oxide dielectric material is $KTa_xNb_{1-x}O_3$, ($0 \leq X \leq 1.0$).

9. An optical element according to claim 1, wherein said optical element is a tunable optical filter.

* * * * *